US008626893B2

(12) United States Patent
Lu et al.

(10) Patent No.: US 8,626,893 B2
(45) Date of Patent: Jan. 7, 2014

(54) APPLICATION LAYER PROTOCOL SUPPORT FOR SLEEPING NODES IN CONSTRAINED NETWORKS

(75) Inventors: Guang Lu, Dollard-des-Ormeaux (CA); Dale N. Seed, Allentown, PA (US); Jean-Louis Gauvreau, La Prairie (CA); Shamim Akbar Rahman, Cote St. Luc (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 93 days.

(21) Appl. No.: 13/162,757

(22) Filed: Jun. 17, 2011

(65) Prior Publication Data

US 2012/0151028 A1 Jun. 14, 2012

Related U.S. Application Data

(60) Provisional application No. 61/355,679, filed on Jun. 17, 2010, provisional application No. 61/376,468, filed on Aug. 24, 2010, provisional application No. 61/416,915, filed on Nov. 24, 2010.

(51) Int. Cl.
*G06F 15/173* (2006.01)

(52) U.S. Cl.
USPC ........... 709/223; 709/224; 709/227; 370/328; 370/338; 370/332; 370/352; 340/286.1; 713/323

(58) Field of Classification Search
USPC .......... 709/223, 224, 227; 370/328, 332, 338, 370/352; 713/323
See application file for complete search history.

(56) References Cited

U.S. PATENT DOCUMENTS

| 8,077,015 | B1* | 12/2011 | Kammer et al. | 340/286.01 |
| 8,249,037 | B2* | 8/2012 | Bachmann et al. | 370/338 |
| 2006/0002320 | A1 | 1/2006 | Costa-Requena et al. | |
| 2006/0014534 | A1 | 1/2006 | Costa-Requena et al. | |
| 2006/0075100 | A1 | 4/2006 | Stirbu | |
| 2008/0098241 | A1 | 4/2008 | Cheshire | |
| 2009/0046610 | A1 | 2/2009 | Yamaji | |
| 2010/0125744 | A1* | 5/2010 | Hong | 713/323 |
| 2010/0208660 | A1* | 8/2010 | Ji | 370/328 |
| 2011/0244792 | A1* | 10/2011 | Park et al. | 455/39 |

OTHER PUBLICATIONS

Rahman et al., "Sleeping and Multicast Considerations for CoAP: draft-rahman-core-sleeping-00.txt", CoRE Group, Internet Draft, Jun. 29, 2010, 1-16.
Shelby et al., "Constrained Application Protocol (CoAP): draft-ietf-core-coap-00", CoRE Working Group, Internet-Draft, Jun. 7, 2010, 1-31.

* cited by examiner

*Primary Examiner* — Kyung H Shin
(74) *Attorney, Agent, or Firm* — Condo Roccia LLP

(57) ABSTRACT

Methods and systems providing application layer support for one or more sleeping nodes in constrained networks are contemplated. Embodiments contemplate inserting sleep information in a header option or payload of an application layer message. The application layer message may be conveyed in a hypertext transfer protocol (HTTP) or a constrained application protocol (CoAP). Embodiments contemplate communicating the application layer message to a server, which may serve as a caching and/or buffering proxy.

16 Claims, 30 Drawing Sheets

Template:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver| T |   O   | Type Specific |        Transaction ID         |
+-+-+-+-+-+-+-+-+-+-+-+-+-+-+-+-+-+-+-+-+-+-+-+-+-+-+-+-+-+-+-+-+
|   Options (if any) ...
+-+-+-+-+-+-+-+-+-+-+-+-+-+-+-+-+-+-+-+-+-+-+-+-+-+-+-+-+-+-+-+-+
|   Payload (if any) ...
+-+-+-+-+-+-+-+-+-+-+-+-+-+-+-+-+-+-+-+-+-+-+-+-+-+-+-+-+-+-+-+-+
```

Request (T=0):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|0 0|   O   |A| R | Meth  |        Transaction ID         |
+-+-+-+-+-+-+-+-+-+-+-+-+-+-+-+-+-+-+-+-+-+-+-+-+-+-+-+-+-+-+-+-+
|   Options (if any) ...
+-+-+-+-+-+-+-+-+-+-+-+-+-+-+-+-+-+-+-+-+-+-+-+-+-+-+-+-+-+-+-+-+
|   Payload (if any) ...
+-+-+-+-+-+-+-+-+-+-+-+-+-+-+-+-+-+-+-+-+-+-+-+-+-+-+-+-+-+-+-+-+
```

Response (T=1):

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|0 1|   O   | R |    Code   |        Transaction ID         |
+-+-+-+-+-+-+-+-+-+-+-+-+-+-+-+-+-+-+-+-+-+-+-+-+-+-+-+-+-+-+-+-+
|   Options (if any) ...
+-+-+-+-+-+-+-+-+-+-+-+-+-+-+-+-+-+-+-+-+-+-+-+-+-+-+-+-+-+-+-+-+
|   Payload (if any) ...
+-+-+-+-+-+-+-+-+-+-+-+-+-+-+-+-+-+-+-+-+-+-+-+-+-+-+-+-+-+-+-+-+
```

FIG. 4

```
Client                                                              Server
  |                                                                    |
  |------------- 1. CON REQUEST (GET, ---------------------------------→|
  |              sensor1.example.com:CoAP-PORT/.well-known/r)           |
  |                                                                    |
  |←------------ 2. ACK RESPONSE (200 OK) ------------------------------|
  |                                                                    |
Payload:
</sensor1/temp>; sh=/t; ct=0,41; n = Temperature,
</sensor1/light>; sh=/l; ct=41; n=Light,
</sensor1/sleep>; sh=/s; ct=41; n=Sleep
```

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1 1 0|OC=0 |1|     POST = 2      |1|        TID = 1234         |
+-+-+-+-+-+-+-+-+-+-+-+-+-+-+-+-+-+-+-+-+-+-+-+-+-+-+-+-+-+-+-+-+
|            Payload = encoded Sleep Information                |
+-+-+-+-+-+-+-+-+-+-+-+-+-+-+-+-+-+-+-+-+-+-+-+-+-+-+-+-+-+-+-+-+

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1 1 0|OC=2 |1|     POST = 2      |1|        TID = 1234         |
+-+-+-+-+-+-+-+-+-+-+-+-+-+-+-+-+-+-+-+-+-+-+-+-+-+-+-+-+-+-+-+-+
|1 10|1|1|  "Sleep Type" (1 Octet)                               |
+-+-+-+-+-+-+-+-+-+-+-+-+-+-+-+-+-+-+-+-+-+-+-+-+-+-+-+-+-+-+-+-+
|1 12|4|1|   "Sleep duration" (4 Octets)                         |
+-+-+-+-+-+-+-+-+-+-+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver| T | Oc|   Code    |             TID               |
+-+-+-+-+-+-+-+-+-+-+-+-+-+-+-+-+-+-+-+-+-+-+-+-+-+-+-+-+-+-+-+-+
|   X   | Length|      "Sleep Duration" (Value in Seconds)      |
+-+-+-+-+-+-+-+-+-+-+-+-+-+-+-+-+-+-+-+-+-+-+-+-+-+-+-+-+-+-+-+-+
|   2   | Length|            "Sleep State" (Awake = 0, Asleep = 1) |
+-+-+-+-+-+-+-+-+-+-+-+-+-+-+-+-+-+-+-+-+-+-+-+-+-+-+-+-+-+-+-+-+
```

FIG. 13

```
Sleep Node                              Proxy or Client Node
    |                                           |
    | <------ CON + GET /temperature [TID=1234] ------ |
    |                                           |

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 1 | 0 | 1 |    GET = 1    |          TID=1234             |
+-+-+-+-+-+-+-+-+-+-+-+-+-+-+-+-+-+-+-+-+-+-+-+-+-+-+-+-+-+-+-+-+
| 9 | 11 |          "temperature" (11 Octets) ...
+-+-+-+-+-+-+-+-+-+-+-+-+-+-+-+-+-+-+-+-+-+-+-+-+-+-+-+-+-+-+-+-+

|                                           |
    |   ---------- ACK (200 OK) [TID=1234] ---------->   |
    |                                           |

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 1 | 2 | 2 |   Code=80     |          TID=1234             |
+-+-+-+-+-+-+-+-+-+-+-+-+-+-+-+-+-+-+-+-+-+-+-+-+-+-+-+-+-+-+-+-+
| X | 1 |   Sleep Duration = 60 Seconds (1 Octet)          |
+-+-+-+-+-+-+-+-+-+-+-+-+-+-+-+-+-+-+-+-+-+-+-+-+-+-+-+-+-+-+-+-+
| 2 | 1 |   Sleep State = 0 (1 Octet)                      |
+-+-+-+-+-+-+-+-+-+-+-+-+-+-+-+-+-+-+-+-+-+-+-+-+-+-+-+-+-+-+-+-+
|             "22.3 C" (6 Octets) ...                       |
+-+-+-+-+-+-+-+-+-+-+-+-+-+-+-+-+-+-+-+-+-+-+-+-+-+-+-+-+-+-+-+-+
```

FIG. 14

APPLICATION LAYER PROTOCOL SUPPORT FOR SLEEPING NODES IN CONSTRAINED NETWORKS

CROSS REFERENCE TO RELATED APPLICATIONS

This application claims the benefit of U.S. Patent Provisional Application No. 61/355,679, titled "Application Layer Protocol Support for Sleeping Nodes in Constrained Networks", filed on Jun. 17, 2010; U.S. Patent Provisional Application No. 61/376,468, titled "Methods and Systems Providing Application Layer Support for Sleeping Nodes in Constrained Networks", filed on Aug. 24, 2010; U.S. Patent Provisional Application No. 61/416,915, titled "Methods and Systems Providing Application Layer Support for Sleeping Nodes in Constrained Networks", filed on Nov. 24, 2010, the content of all three applications being hereby incorporated by reference herein, for all purposes.

BACKGROUND

A constrained network and the nodes within them have may have limited packet sizes, may exhibit a high degree of packet loss, and may have a substantial number of devices that may be in a sleep mode (e.g., powered off) at any point in time but periodically "wake up" for brief periods of time. Nodes of constrained networks may be characterized by limits on throughput, available power, and/or RAM, and may be connected over a low power wireless connection (e.g., LoWPAN (Low-Power Wireless Personal Area Networks), such as IEEE 802.15.4).

In many applications that use IEEE 802.15.4, nodes are battery powered, and battery replacement or recharging in relatively short intervals may often be impractical. Therefore, power consumption may be of concern. Battery-powered nodes may often require duty-cycling to reduce power consumption. These devices may spend most of their operational life in a sleep mode; however, each node may periodically listen to an RF channel in order to determine whether a message is pending. This mechanism allows the application designer to decide on the balance between battery consumption and message latency. IEEE 802.15.4 and 802.15.5 define power saving techniques at the Media Access Control (MAC) and Physical (PHY) layers in constrained networks.

IEEE 802.15.4 defines two ways of synchronization between nodes, both with and without beacons. The standard sets forth that all devices operating on a beacon-enabled Personal Area Network (PAN) shall be able to acquire beacon synchronization in order to detect any pending messages or to track the beacon. Further, all devices operating on a non-beacon-enabled PAN shall be able to poll the coordinator for data at the discretion of the next higher layer.

IEEE 802.15.5 defines a Synchronous Energy Saving (SES) power saving mechanism that utilizes a synchronous time schedule for data transmission. For SES, all mesh devices should be synchronized network-wide and have the same time structure including an active and an inactive duration. A wakeup notification command frame allows a mesh device to notify its own schedule information to neighbors in the optional energy saving mode. When a setting (e.g., meshASESOn) is set to TRUE, it should be transmitted at the beginning of the active duration for every wakeup interval.

Constrained Application Protocol (CoAP) is an HTTP-like application layer protocol designed for constrained networks. The protocol is REQUEST/RESPONSE based and uses the Representational State Transfer (REST) architecture. CoAP defines at least 4 HTTP-like methods, for example GET, POST, PUT and DELETE.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein are systems and methods for application layer protocol support for sleeping nodes in constrained networks. According to an aspect, a proxy node in a communication system may include an interface configured to communicate with a sleep node in a constrained network. The proxy node may also include a resource management function configured to receive sleep information from the sleep node. Further, the resource management function may be configured to manage a resource of one of the proxy node and the sleep node based on the sleep information.

Disclosed herein are methods and systems providing application layer support for sleeping nodes in constrained networks. According to an aspect, a method may include inserting sleep information in a header option or payload of an application layer message. The method may also include communicating the application layer message to a server.

According to another aspect, a method may include storing sleep information in a URI of a message. The method may also include communicating the application layer message to a server.

Disclosed herein are methods and systems providing application layer support for sleeping nodes in constrained networks. According to an aspect, a method may include inserting sleep information in a header option or payload of an application layer message. Further, the method may include communicating the application layer message to a server, proxy or client.

According to another aspect, a method is disclosed that may include storing sleep attribute information using a dedicated sleep attributes CoAP resource with corresponding URI. The method may also include communicating the application layer message to a server.

According to another aspect, a method may include supporting sleep attributes to being added in a request URI field within a CoAP header options. This aspect may be used rather than defining new dedicated attribute header options.

According to another aspect, a method is disclosed that may include receiving a message targeting a sleeping node. Further, the method may include determining that the node is sleeping. The method may also include buffering the message in response to determining that the node is sleeping. In response to determining that the node is available, the message may be forwarded to the node.

According to another aspect, a method is disclosed that may include caching a subscription to a resource residing on a sleep node. The method may also include storing a state of the sleep node. Further, the method may include sending a notification of the state of the sleep node to a subscriber.

Embodiments contemplate a first node, where the first node may be associated with a first communication network and the first node may be in communication with a second communication network. The first node being may be configured, at least in part, to communicate with a second node, where the second node may be associated with the second communication network. Embodiments contemplate that the first node may also receive sleep information from the second node, and may manage at least one resource of the second node based, at least in part, on the sleep information. Embodiments contemplate that the first node may be a non-constrained node, and that the first node may functions as a proxy node. Also embodiments contemplate that the second node may be a constrained node. Further, embodiments contemplate that the first node may be further configured to receive an application layer message from the second node, where the sleep information may be included in one or more fields of the application layer message.

Embodiments contemplate methods that may be performed by a first node, where the first node may be associated with a first communication network and the first node may be in communication with a second communication network. The method may comprise communicating with a second node, where the second node may be associated with the second communication network. Embodiments contemplate that the method may include receiving sleep information from the second node and managing at least one resource of the second node based, at least in part, on the sleep information. Embodiments contemplate that the first node may receive an application layer message from the second node. Embodiments contemplate that the sleep information may be included in one or more fields of the application layer message, and the one or more fields of the application layer message may be a part of at least one of a header or a payload. In addition, the first node may subscribe to the second node to receive the sleep information, and also the method may further include responding to the second node upon receipt of the sleep information.

Embodiments contemplate methods that may be performed by a first node, where the first node may be associated with a first communication network and the first node may be in communication with a second communication network. The method may include communicating with a second node, where the second node may be associated with the second communication network. The method may also include receiving at least one of a hypertext transfer protocol (HTTP) or a constrained application protocol (CoAP) message from the second node, where the HTTP or the CoAP may include at least one header. The method may also include determining one or more sleep attributes of the second node from the at least one HTTP or CoAP message header, and responding to the message from the second node. Embodiments contemplate that the sleep attributes may be represented by a uniform resource identifier (URI) in the at least one HTTP or CoAP message header. Embodiments also contemplate synchronizing with the second node upon the second node transitioning form a sleep mode to a non-sleep mode. Further, embodiments contemplate placing the second node into a sleep mode.

BRIEF DESCRIPTION OF THE DRAWINGS

A more detailed understanding may be had from the following description, given by way of example in conjunction with the accompanying drawings wherein:

FIG. 4 illustrates a definition of the CoAP message header format;

FIG. 6 is a message flow diagram of an exemplary exchange of sleep information using a link format;

FIG. 10 is a diagram of an exemplary CoAP POST request message with sleep information;

FIG. 13 is a CoAP message with sleep attributes header options according to embodiments;

FIG. 14 is a CoAP message exchange with sleep attributes header options according to embodiments;

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
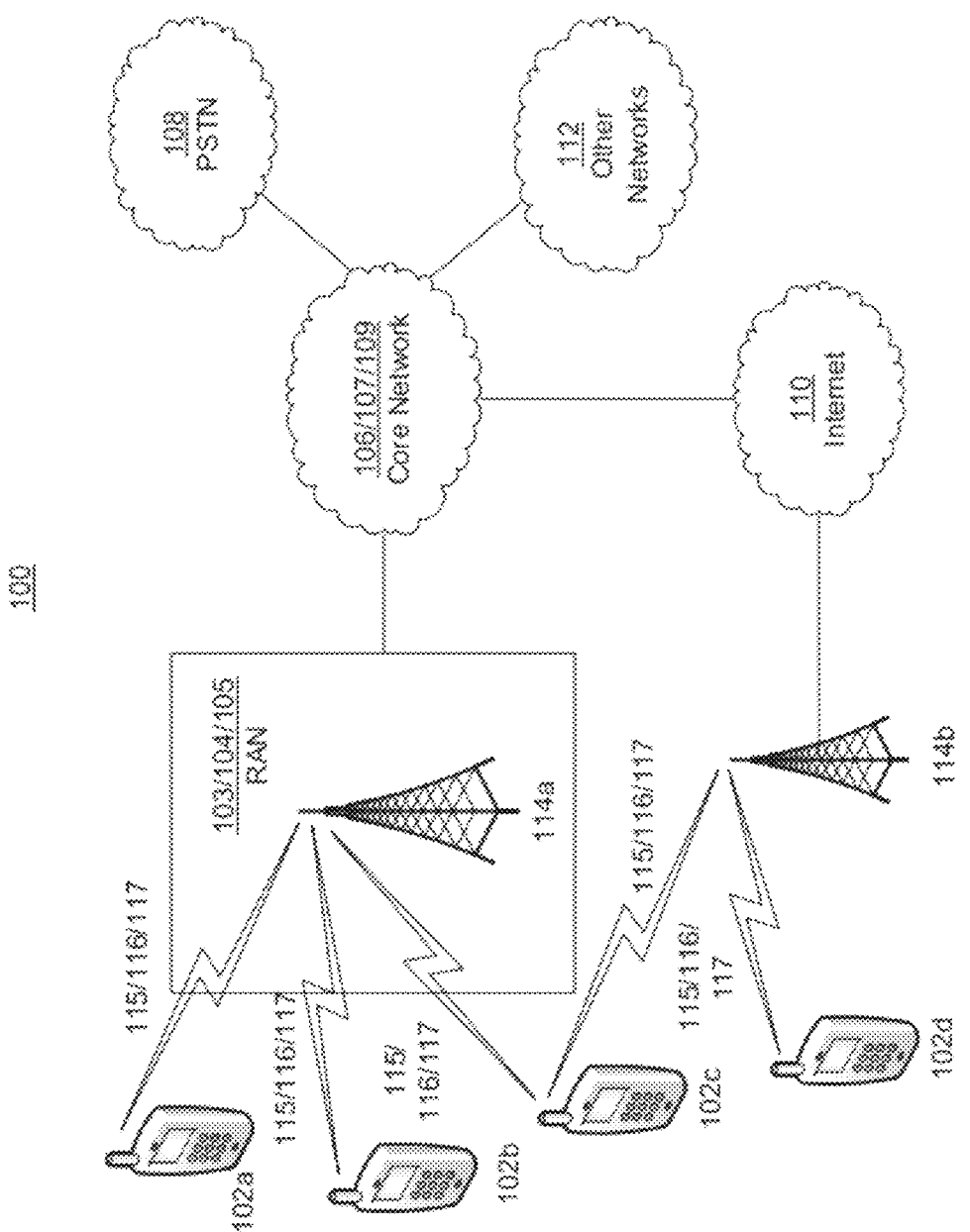
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
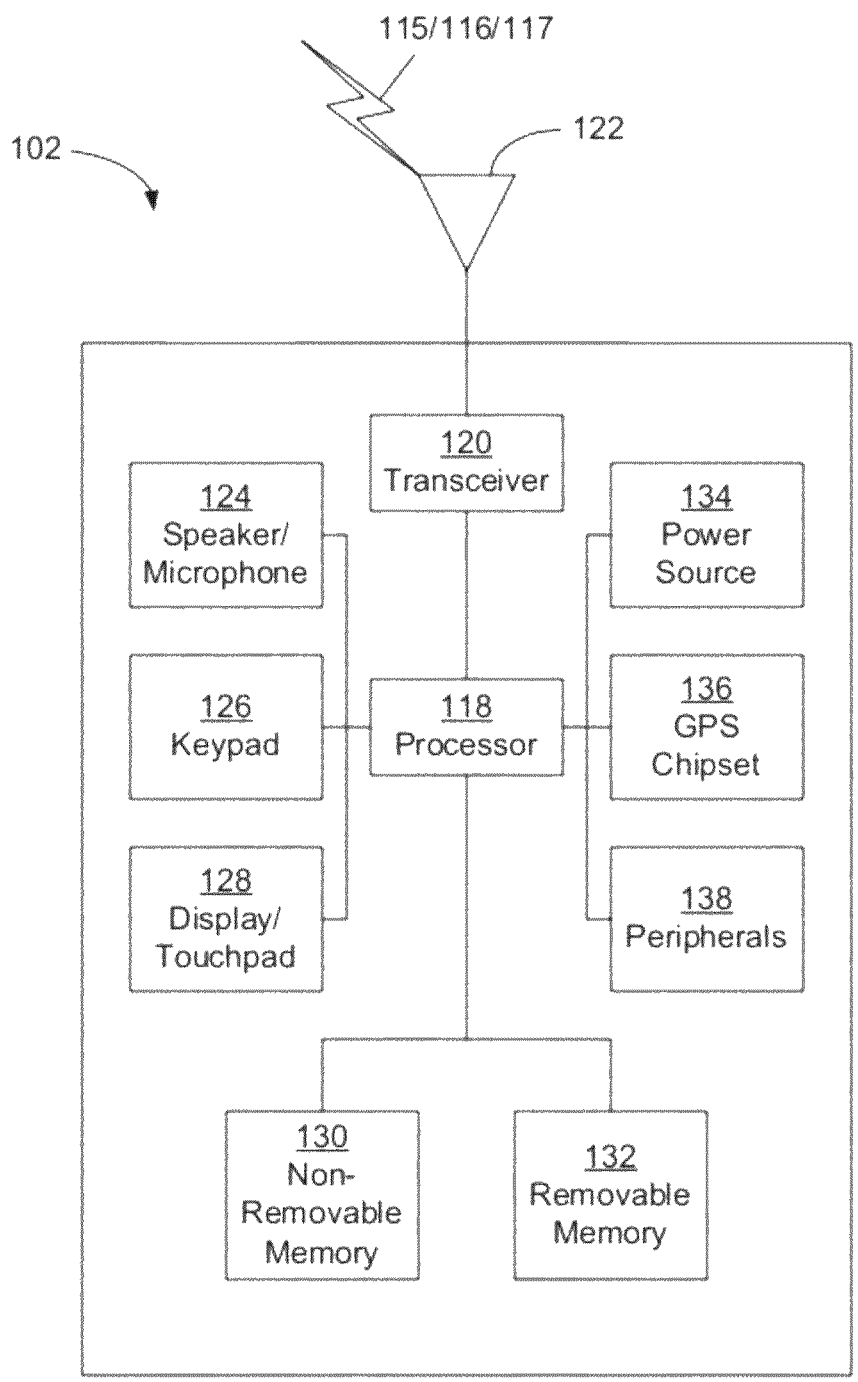
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
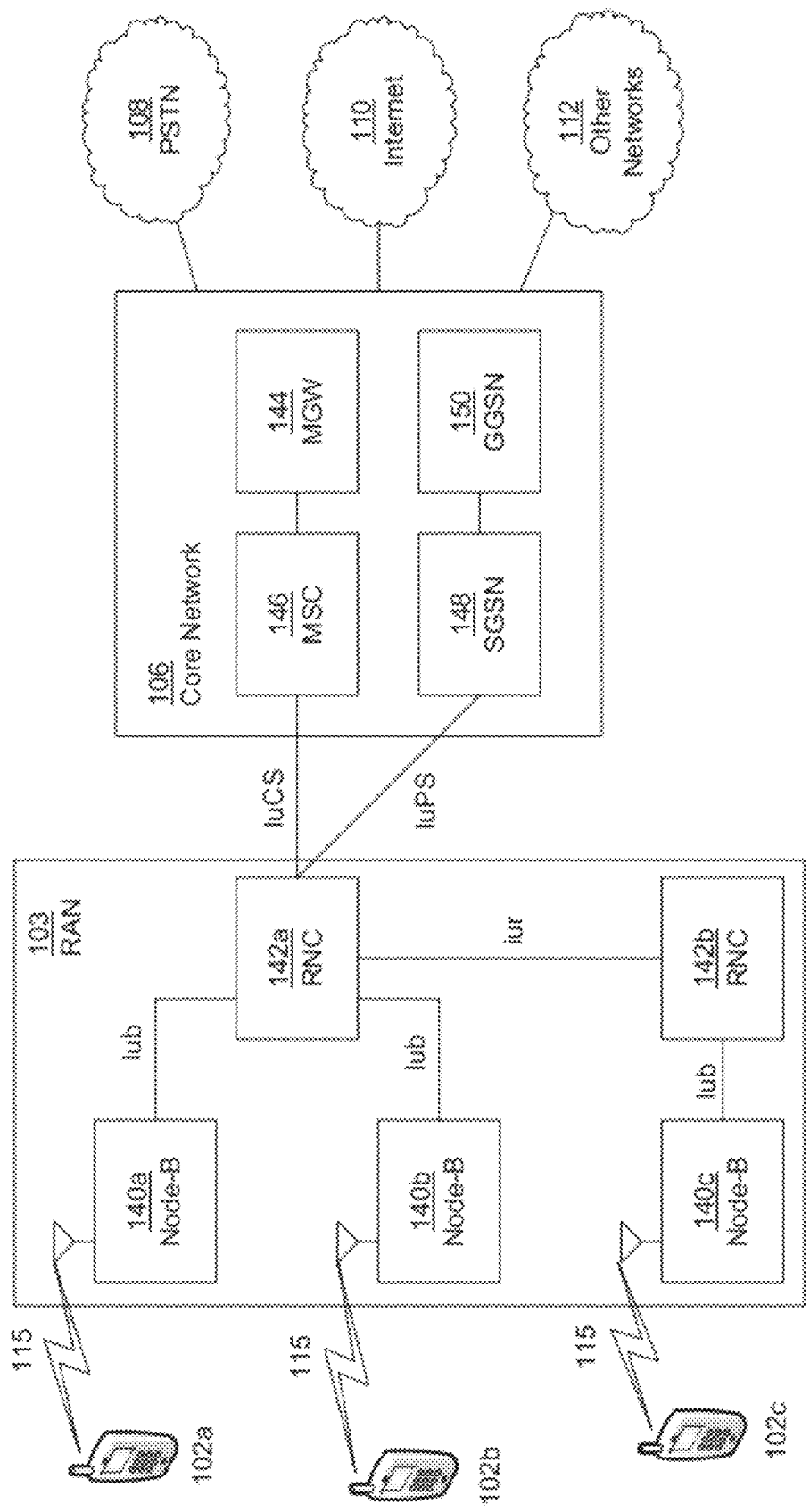
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/ or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
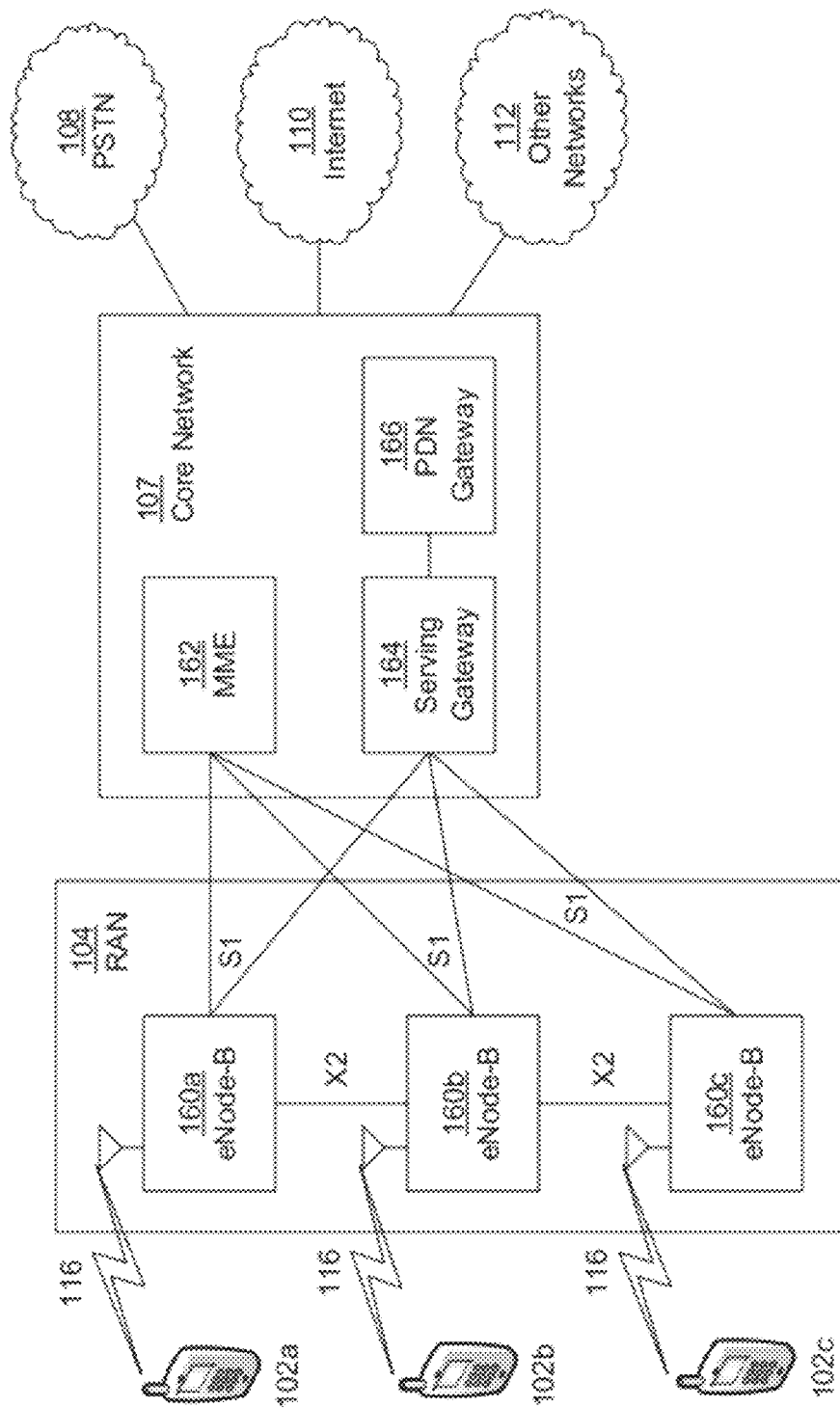
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
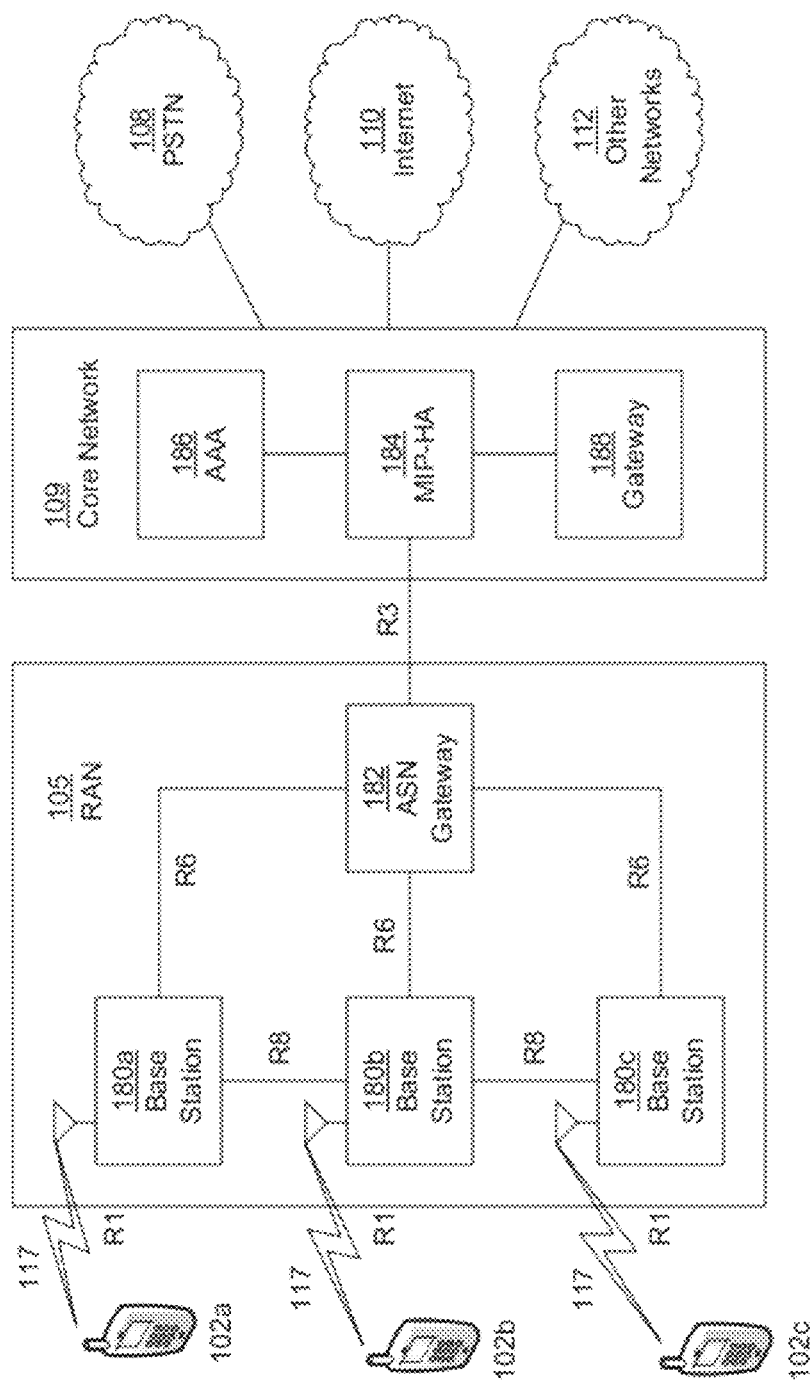
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

As referred to herein, the term "sleep mode" refers to a state in which a device or node is not capable of sending or receiving messages. This mode may be entered for the purpose of power conservation at the device or node, for example.

As referred to herein, the term "sleep node" refers to a node or device that is capable of entering a sleep mode. The sleep mode may be entered at any time. One or more sleep nodes may be in, for example, a constrained network. A sleeping node may refer to a node currently in the sleep mode.

In constrained networks, nodes are often battery powered with limited capacity. In the interest of power conservation, such nodes spend most of the time in sleep mode. The presently disclosed systems and methods are capable of managing sleeping. In constrained networks, nodes are often battery powered with limited capacity. In the interest of power conservation, such nodes spend most of the time in sleep mode. The presently disclosed systems and methods are capable of managing sleeping nodes in constrained networks. Also, the presently disclosed systems and methods are capable of providing application layer support for sleeping nodes in constrained networks.

Although MAC and PHY layers typically have mechanisms for power saving (e.g., turn off transmitter and receiver for a short period of time and listen to the RF channel periodically), it the present subject matter provides improved techniques for application layer protocols to efficiently manage sleep nodes as well. When the application layer is aware and able to handle sleep nodes, it can help provide additional power saving mechanisms complementary to those supported by the lower layers. Unfortunately, current application layer protocols such as HTTP as well as the proposed constrained application layer protocol CoAP do not support sleep-aware mechanisms such as the sharing of sleep schedule information nor the synchronization of devices at the application layer. On the other hand, if the application layer is not able to handle sleep situations, sleeping can cause long delays in message delivery, unnecessary retransmissions, or even cause disconnection at the application layer. This can severely impact applications and user experience.

Embodiments contemplate that HTTP may also run on constrained devices. For example, constrained devices that are connected to the Internet (e.g. Zigbee devices) may run HTTP as an application. The CoAP protocol is contemplated as perhaps more efficient than HTTP and hence may improve performance for constrained devices. One or more embodiments contemplate that constrained devices may run on HTTP alone.

Embodiments contemplate scenarios in which where the normal device may run HTTP (e.g. web browser on a laptop). Such normal devices may want to communicate with a constrained device (e.g. light switch in the home) that may run CoAP. For example, the owner of a home goes to his web browser (on his laptop) to set his home light switch to turn on at 7 pm since he will be arriving home late and wants the lights to be on upon his arrival. The web browser may then send HTTP messages to a proxy in the home. The proxy may then process the HTTP message as described herein (e.g., if the light switch is sleeping at that moment) and may then convert the message to CoAP at a proper time. The CoAP protocol describes how to do the HTTP to CoAP conversion. Embodiments described herein contemplate how to do the signaling, buffering, and processing, among other actions, at the application layer. Embodiments described herein also contemplate how to do the signaling, buffering, and processing, among other actions, at the application layer if the constrained node is asleep.

Embodiments contemplate that constrained networks may be connected to the Internet, where for example the Internet connection may be the Layer 3 connection, while the IEEE 802.15.4 connection may be the Layer 2 connection. Embodiments also contemplate scenarios in which a normal (e.g., non-constrained) node, perhaps anywhere on the Internet, communicates with a constrained node (e.g., where a constrained node may be asleep when the non-constrained node sends a message to it). The CoAP or HTTP application layer signaling, by way of example and not limitation perhaps somewhere in Layers 4-7, would be running on top of Layers 3 (Internet) and Layers 2 (e.g., IEEE 802.15.4 for the constrained device, and perhaps Ethernet for the normal device).

In accordance with embodiments of the presently disclosed subject matter, sleep-aware support is provided to an application layer protocol that is not supported by existing application layer protocols such as, for example, HTTP or CoAP. Doing so, enables an application layer protocol to more effectively optimize the exchange of application layer messages and as a result maximize the overall efficiency of sleep nodes and proxies. For example, by making sleep schedule information available to a proxy's application layer, the proxy can then implement enhancements to its application layer protocol and messaging that allow it to maintain tighter synchronization with a sleep node. Therefore, the sleep node does not need to check-in with the proxy each time it wakes up, thus optimizing the node's battery lifetime and reducing signaling messages.

Figure 2:
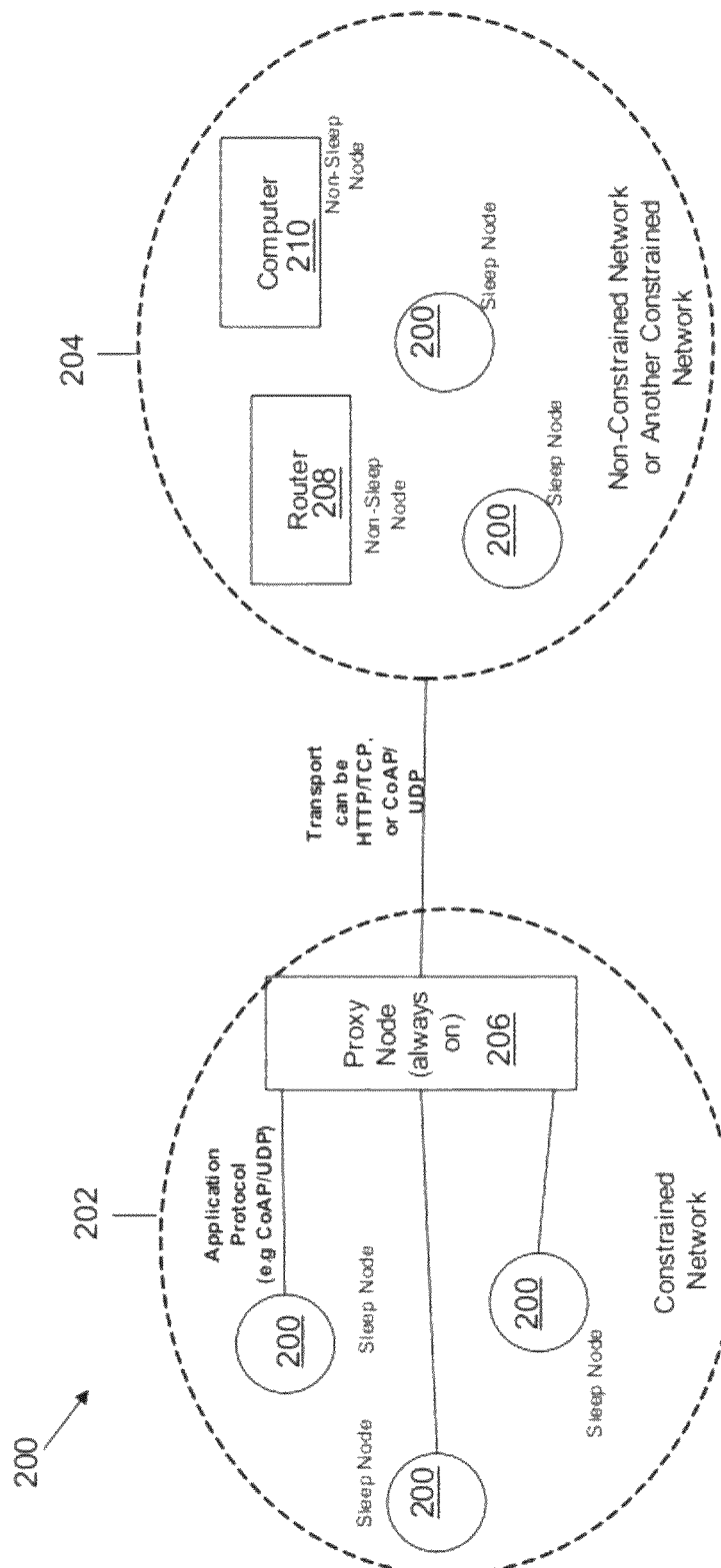
FIG. 2 is a schematic diagram of exemplary sleeping nodes in constrained and non-constrained networks and an exemplary proxy node.

FIG. 2 illustrates a schematic diagram of exemplary sleeping nodes 200 in constrained and non-constrained networks 202 and 204, respectively, and an exemplary proxy node 206. This example is used for illustrating various embodiments of the presently disclosed subject matter. In the constrained network 202, most or all nodes 200 can be sleep nodes. The proxy node 206 may stay on all the time and proxies the messages for the sleep nodes 200. The constrained network 202 can be connected to the non-constrained network 204, or another constrained network. Each constrained network can have non-sleep nodes and/or sleep nodes. The non-constrained network 204 may include non-sleep nodes (e.g., a router 208 and computer 210). The application layer protocol, discussed as an HTTP-like protocol (such as CoAP) in this disclosure, may be configured to be aware of and to handle sleep nodes.

The presently disclosed subject matter provides application layer methods for supporting sleep nodes in constrained networks, that may include proxy nodes. The systems and methods disclosed herein may manage how sleep nodes and proxy nodes exchange sleep information, what sleep information can be exchanged, and how the sleep information can be utilized. The methods may include: using URI represented resources to exchange sleep information; using header field (e.g., CoAP header option); and using reserved fields in protocol header. The systems and methods disclosed herein may also manage how sleep and proxy nodes obtain and maintain synchronization by leveraging the exchange of sleep information. The systems and methods disclosed herein may also manage proxy initiated and controlled sleep scheduling. Further, the systems and methods disclosed herein manage proxy operation when both source and destination nodes are sleep nodes. The systems and methods disclosed herein also reduce overhead for sleep nodes. These methods and systems are described in more detail herein below. Although these methods and systems are described in the context of a CoAP in a constrained network, these methods and systems may also be applied to any other suitable protocols as well as in a non-constrained network.

Embodiments contemplate indications of sleep modes. A node can provide its power consumption mode, for example, whether it may go to sleep mode (e.g., sleep mode) or it will always be powered on (e.g., no sleep mode) to the proxy node or other nodes at the application protocol layer. This can ease the operation at the proxy node. For example, when the proxy node receives messages destined for a "non-sleep node", the proxy node may decide not to cache for the node and can instead forward messages, perhaps immediately. Otherwise, if the node is a "sleep node", the proxy can decide to always cache messages destined for the sleep node.

In addition to indication of sleep mode, a sleep node and the proxy node can exchange more detailed sleep information so the proxy node can make more informed decisions about caching and message delivery.

Sleep information can be exchanged between the sleep node and proxy using CoAP messages at anytime. The sleep information can be sent by the constrained node, or by the proxy. When the sleep information is available at the sleep node, the sleep node can inform the proxy (or other sleep nodes) of its sleep schedule. In another way, a proxy can instruct or configure a constrained node of its sleep schedule. A sleep node can use methods such as POST/PUT to inform the proxy about its sleep information. Alternatively, the proxy may subscribe to the sleep info and get notified when it changes.

Several mechanisms to exchange sleep information using CoAP are discussed in details below. The figures use the notion of client and server. A client is the node that initiates the CoAP request and a server is the recipient of the request. A client and server can be constrained nodes or proxies.

Embodiments contemplate the exchange of sleep information at application protocol. Below are examples of sleep information that a sleep node and a proxy may exchange.

Indication of Sleep Mode
        Sleep or non-sleep node; and/or
        Sleep pattern: periodic, ad-hoc, etc.
    Node's Sleep Schedule (Note: relative time can be used as
        discussed below)
        Sleep start time;
        Wake up time;
        Sleep interval;
        Awake duration; and/or
        Time unit.

Triggers for a node to switch to sleep mode. Knowing the trigger can help the proxy node predict the device's next sleep cycle, and this is especially helpful when the node's sleep schedule is event based and unpredictable.

E.g. a battery-powered device switches to sleep mode when it reaches a certain percentile of remaining battery; and/or E.g. a smart meter switches to sleep mode each time a Report is sent (e.g. sends POST to certain URI).

The sleep information may provide proxy(s) or other nodes with awareness of resources that they are able to proxy for, as well as which devices sleep and their corresponding sleep cycle attributes. Using this sleep information, the proxy(s) could choose which device resources it wants to create/maintain intercept caches for (e.g. support intercept caches only for sleeping devices). The information can also be used by the proxy to optimize the size of a device's intercept cache. For example, nodes with longer sleep cycles could be allocated larger caches vs. nodes with shorter sleep cycles.

The following sections discuss detailed techniques for sleep node and proxy node exchange of sleep information using an HTTP-like application protocol. The CoAP protocol may be used as an example for the purpose of discussions. It should be noted that the individual methods described can be used independently or in a combined manner.

Embodiments contemplate that sleep information can be treated as a resource and represented by a URI. This may allow a proxy or other nodes to retrieve a node's sleep information, or may allow the constrained node to post the sleep information to the proxy.

Figure 3:
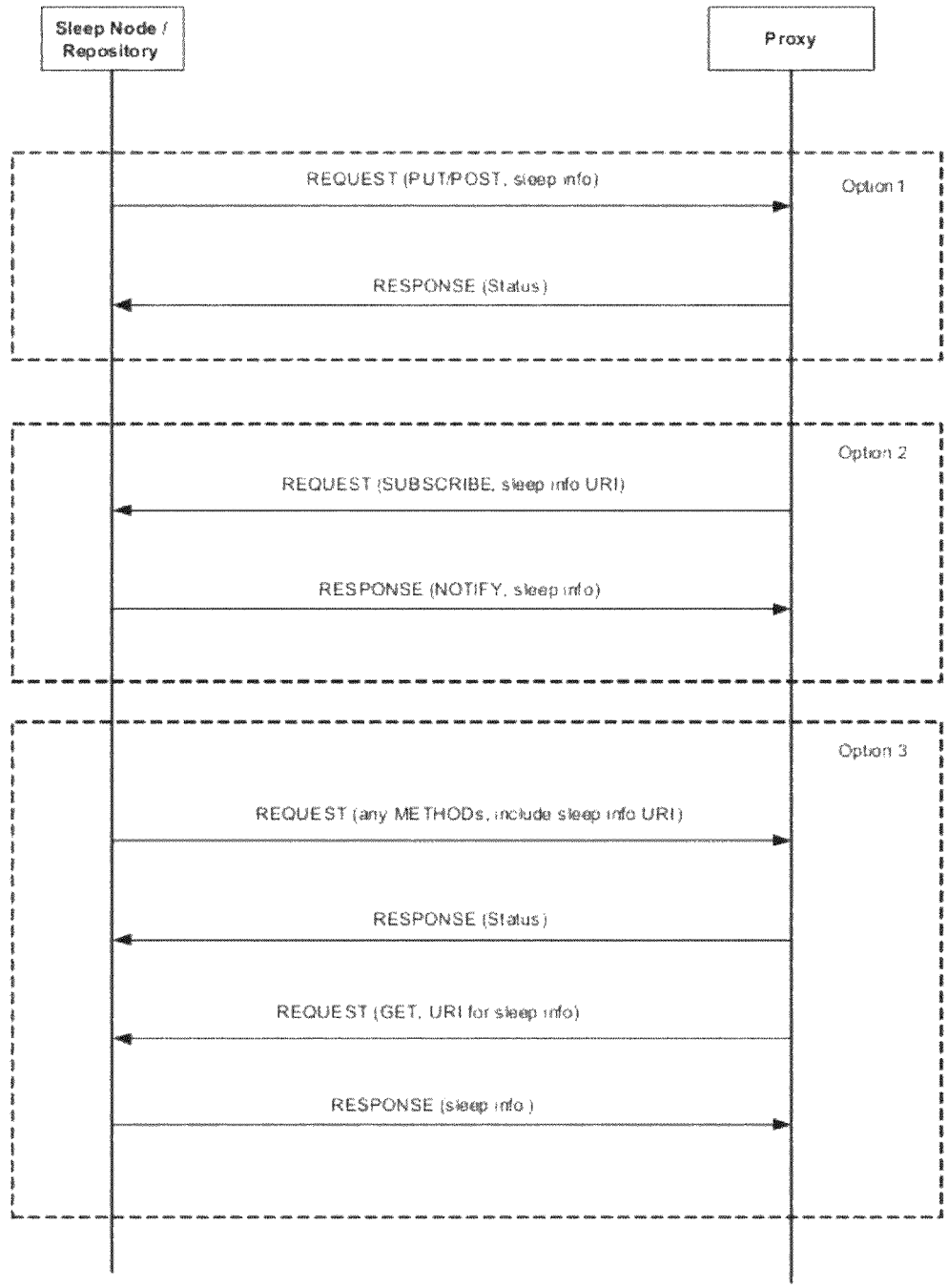
FIG. 3 is an exemplary messaging diagram including three options of how to use a URI for sharing sleep information.

A sleep node can support a URI which may allow a proxy node to retrieve the sleep node's sleep information or may allow the sleep node to post the sleep information to the proxy node. This approach may provide for the exchange of more sophisticated sleep information, and the format can be more flexible (in comparison to embedding sleep information into the headers of existing message exchanges, for example). FIG. 3 illustrates an exemplary messaging diagram including three options of how to use a URI for sharing sleep information. As an extension, the URI of a sleep node may be stored in a repository, not the sleep node itself.

In option 1 of FIG. 3, the sleep node can use methods such as POST/PUT to inform the proxy about its sleep information.

In option 2 of FIG. 3, the proxy node may subscribe to the sleep information URI and gets notified when it changes. This is based on the assumption that the proxy node knows the URI for the sleep information. The proxy can receive the URI information if the sleep node sends it to the proxy node (such as mentioned in Option 3 below), or "well known" resource can be defined to represent sleep information during resource discovery.

In option 3 of FIG. 3, the sleep node includes the sleep information in a message, such as in the option header as discussed in more detail below. The actual method of the message can be any type thus the sleep info URI can be piggy-backed. The proxy node can use GET to retrieve the sleep info stored under this URI.

Typical information stored in the URI to describe the sleep pattern may include the sleep interval, sleep pattern type (event triggered, periodic), and start of next sleeping interval. The semantics on how the sleeping information is stored could be standardized using a language such as, but not limited to, HTML.

Below are examples of the URI (URL) representation of sleep information. CoAP [I-D.draft-ietf-core-coap] splits the URI into Uri-Scheme, Uri-Authority and Uri-Path Options.

Coap://sensor1.example.com:COAP_TBD_PORT/Sleep-Info;

Coap://sensor1.example.com:COAP_TBD_PORT/Sleep-Info/SleepType; and/or

Coap://sensor1.example.com:COAP_TBD_PORT/Sleep-Info/SleepDuration.

The sleep information URI can be exchanged during CoAP resource discovery using link format. The sleep information can be carried in link-value, link-extensions, etc. FIG. 6 illustrates a message flow diagram of an exemplary exchange of sleep information using a link format.

Alternatively, in CoAP discovery, the CoAP well-known URI can be used to carry the sleep information. For example, /.well-known/r/sleep (assuming /.well-known/r is the CoAP well-known URI). Therefore a proxy can query a node about its sleep schedule using GET request. [GET/.well-known/r/sleep] returns a list of sleep information stored under this location.

FIG. 4 illustrates a definition of the CoAP message header format. This definition provides an example of the message format in a constrained application layer protocol. The header fields are defined in the following paragraphs.

Ver (Version): A 2-bit unsigned integer that indicates the version of CoAP. This field is set to 0. The values 1-3 are reserved for future versions.

T (2-bit Message Type Flag): Indicates if this message is a CoAP request (0), response (1), or notify (2) header. The value 3 is forbidden to avoid collision with the magic byte 'r'.

O (4-bit Number of Options Field): Indicates if there are option headers following the base header. If set to 0, the payload (if any) immediately follows the base header. If greater than 0, the field indicates the number of options to immediately follow the header.

A (1-bit Acknowledgement Flag): When set to 1, indicates that the destination must respond with a response message matching this request. When set to 0, the destination must not send a response to this request.

Meth (4-bit Unsigned Integer): This field indicates the CoAP method of the request, including GET, POST, PUT, DELETER, and SUBSCRIBE.

Code (6-bit unsigned integer): This field indicates the code of a response or notify message.

Transaction ID (16-bit Unsigned Integer): A unique transaction ID assigned by the source and used to match responses. The transaction ID must be changed for each new request (regardless of the end-point) and must not be changed when retransmitting a request.

_____: This field is unused. It must be initialized to zero by the sender and must be ignored by the receiver.

Embodiments contemplate techniques to support unicast and multicast transport in a constrained network.

Figure 7:
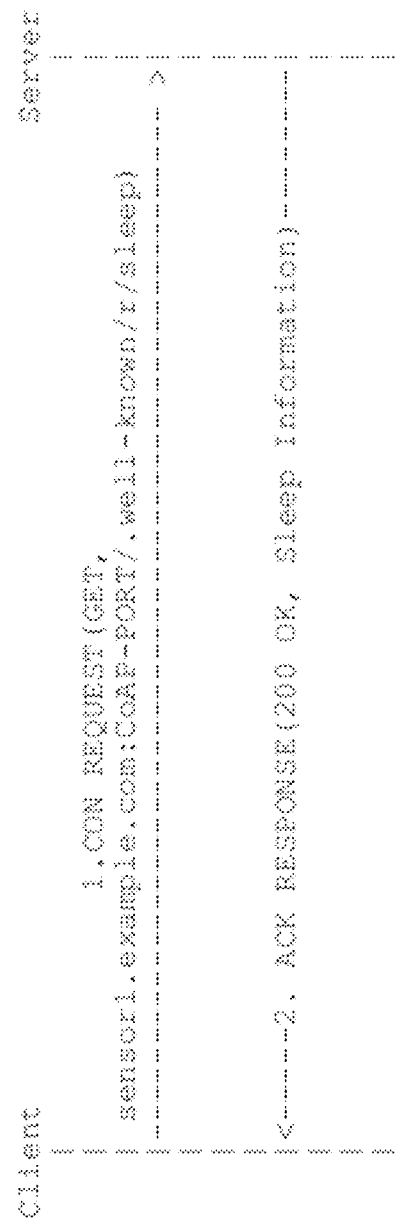
FIG. 7 is a message flow diagram of an exemplary exchange of sleep information using well-known URI.

FIG. 7 illustrates a message flow diagram of an exemplary exchange of sleep information using, perhaps in some embodiments well-known, URI.

Figure 8:
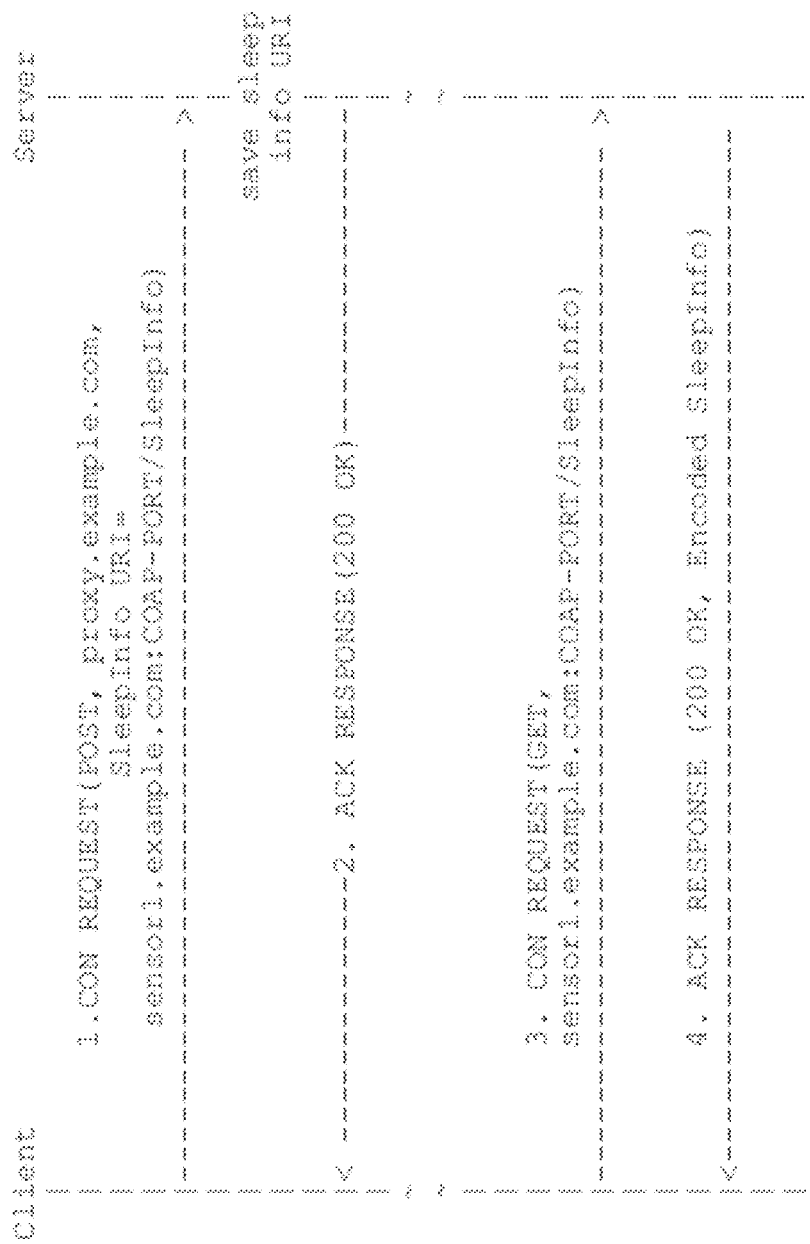
FIG. 8 is a message flow diagram of another exemplary exchange of sleep information using URI.

FIG. 8 illustrates a message flow diagram of another exemplary exchange of sleep information using URI. The diagram shows the transactions when sleep information URI are exchanged between the client and server. The client informs the server of the sleep information URI. Later the node with the sleep information URI can issue a GET request to obtain the detailed sleep information. Even though the examples herein show that the sensor node posts the sleep information URI to the proxy, both the constrained node and proxy can be either the CoAP client or server. For example, a proxy node may instruct the constrained node to use certain URI to store the sleep information.

Embodiments contemplate utilizing one or more CoAP header option and/or payload fields. The sleep information could also be shared via embedding it (i.e. 'piggy-backing it') within existing application layer protocol messages. Embodiments contemplate that sleep schedule information could be shared in a less costly manner (e.g. by leveraging the existing resources and application layer messaging infrastructure already in place).

For example, the CoAP application layer protocol header options, or CoAP payload could be used to share updated sleep information as a part of every message exchange or alternatively for only a subset of the message exchanges between a sleep node and the proxy node. In the event that sleep information needs to be exchanged at a faster rate than the normal message exchange rate, additional messages could also be generated for the sole purpose of exchanging sleep information within the message header (e.g. a short optimized message with only a header and no data payload could be exchanged). The encoding of the sleep information should follow the Content-type encoding defined by the CoAP protocol.

For example, CoAP specifies TLV format for the Header Options which may be used to encode some sleep pattern information such as the following:
TYPE: Sleep Interval
LEN: 2-bit unsigned integer allowing values of –4 octets, or 10-bit unsigned integer allowing values of 5-1024 octets; and/or
VALUE: Sleep interval in seconds.

Figure 9:
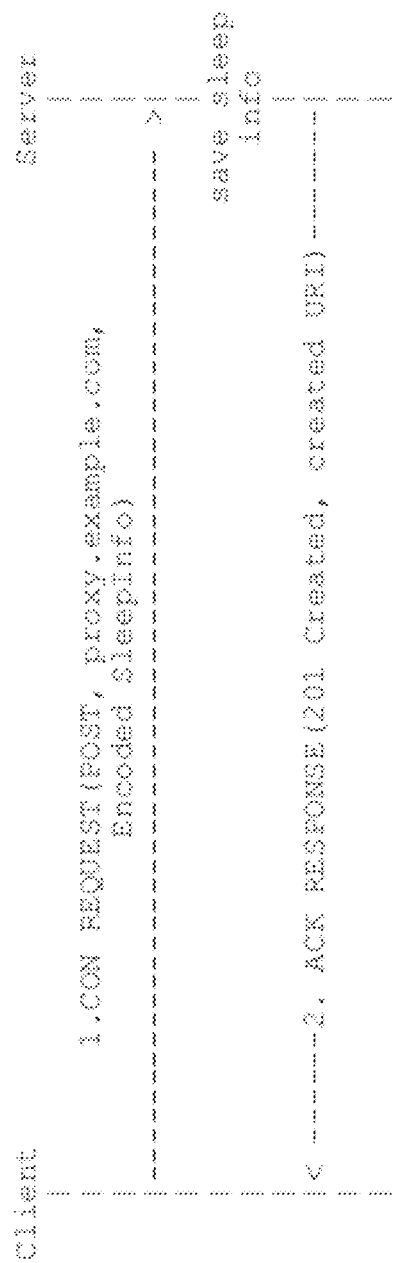
FIG. 9 is a message flow diagram of an exemplary exchange of sleep information using embedded sleep information.

FIG. 9 is a message flow diagram of an exemplary exchange of sleep information using embedded sleep information. Referring to FIG. 9, the figure shows that a client used the POST method to send its sleep information to the server. The server stored the information, created an URI for the stored information and returned the created URI.

FIG. 10 is a diagram of an exemplary CoAP POST request message with sleep information. Referring to FIG. 10, the figure shows how to compose the CoAP POST Request message, adding sleep information in the payload or Header Options respectively. The "Type" of sleep information may be assumed to be 10 and 12 for elective options "Sleep Type" and "Sleep duration". CoAP may define such options for sleep information. TID is Transaction ID.

Embodiments contemplate that reserved values can be used to signify particular sleep patterns. The reserved fields can be in the message header, or header options of an application layer protocol. For example, one reserved bit can inform other nodes that the device is now operating under an unpredictable sleep pattern (triggered by an external event). In another example, another field may be present indicating when the next sleep interval will start. In this example, a reserved value or the absence of this field may signify that the device sleep period has started. In another example, a bit can be reserved to indication a node's sleep mode (as discussed herein previously).

Embodiments contemplate that sleep nodes and proxy node can utilize the exchange of application layer sleep schedule information to help maintain synchronization with one another.

A proxy node can subscribe to a sleep node, and the sleep node can send notify message when it wakes up. In the notify message, the sleep node can include updates for resources as well as sleep cycle information. In this way, the proxy node can maintain loose synchronization with the sleep node. If the proxy node already has a sleep node's sleep information (such as a schedule), and the sleep node and proxy node are synchronized, the sleep node may not need to check-in with the proxy every time it wakes up.

If the proxy node maintains a counter that is reset each time it receives a sleep node's check-in message, it can also keep track of how long a sleep node has been sleeping and how soon before it wakes up. Leveraging this information, a proxy node can more efficiently schedule messages to/from the sleep node (e.g. transmit messages just before a sleep node wakes up to minimize the amount of buffering required by intermediate nodes within a multi-hop constrained network).

Message delivery latency may be considered for synchronization. For example, the time "Now" in a source device would be "Now+message delivery latency" in the destination device, providing both are synchronized in time. The sleep node and the proxy node can exchange their perception of how long "message delivery latency" should be so they can maintain more accurate synchronization.

Embodiments contemplate that a sleep node may switch to sleep mode autonomously based on its own triggers. However, a proxy node (or network) can also initiate sleeping for sleep nodes. For example, a proxy can initiate a command for a sleep node to switch into sleep mode and provide the duration of the sleep time. This may enable the proxy node to have better control and coordination of the sleep nodes in a constrained network, and the proxy node can have a sleep node's schedule without having to get it from the sleep node.

In a HTTP-like application protocol, a new method "SLEEP" can be used for a proxy node to command a sleep node to go to sleep. Alternatively, a sleep node can subscribe to "proxy initiated sleep cycle" and the proxy node may send notification to the sleep node for switching to sleep mode.

Figure 5:
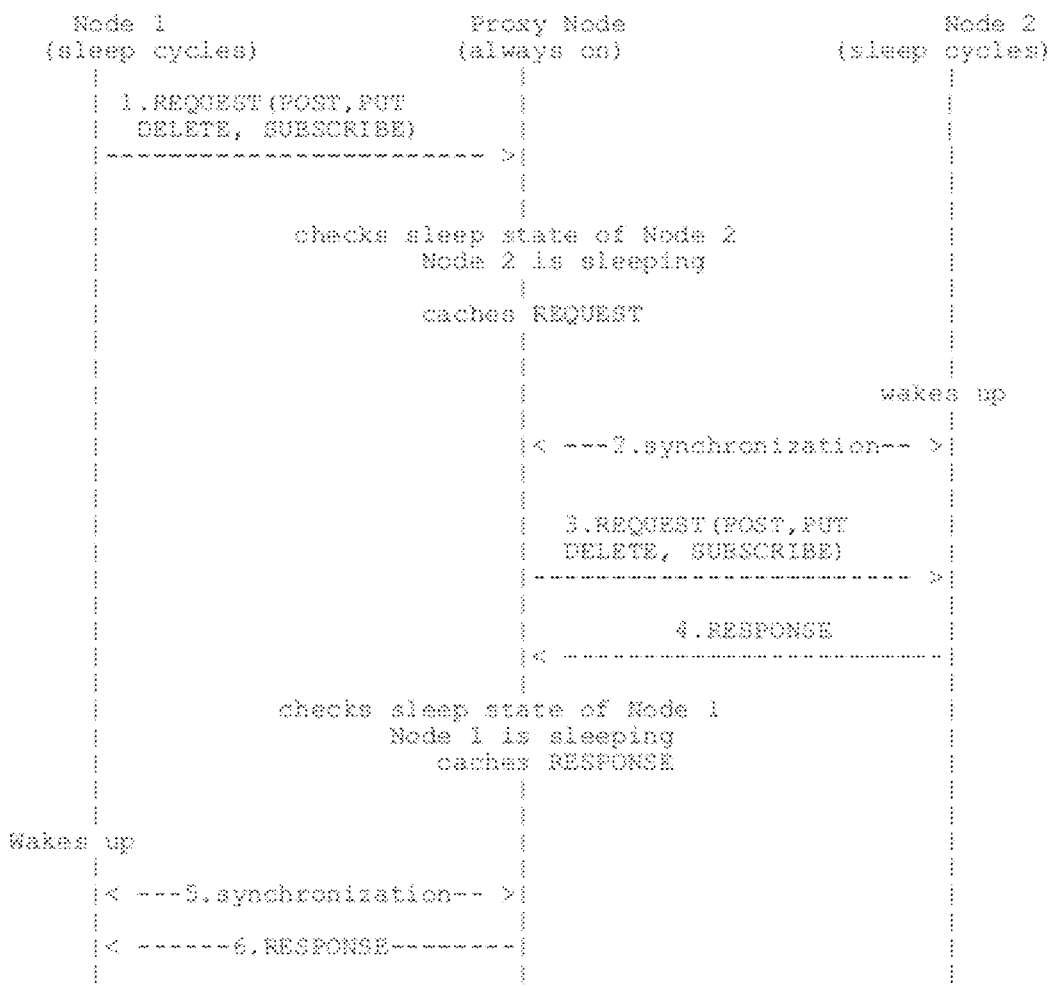
FIG. 5 illustrates an exemplary messaging diagram showing proxy caching for both source and destination nodes.

FIG. 5 illustrates an exemplary messaging diagram showing proxy caching for both source and destination nodes. This is an example when both source and destination nodes (called Node 1 and Node 2) in the communication may go into sleep mode. When a sleep node wakes up, it may send a message to the proxy node, indicating it is awake, providing updated contents, or updating its sleep information. This procedure is marked as "synchronization" in the diagram.

In the example, Node 1 may be assumed to be a constrained node using CoAP and it sends a CoAP REQUEST. The REQUEST may contain any CoAP method, such as GET, POST PUT, DELETE, or SUBSCRIBE. The proxy node may intercept the request, and may check the sleep state of the Node 2 (if Node 2 registered with the proxy about its sleep state), and the proxy node may decide either to cache the REQUEST on behalf of the node, or it can forward the REQUEST.

The POST, PUT, DELETE and SUBSCRIBE methods require certain actions of the destination node so the proxy node will deliver the message to the destination when the destination device is awake.

The GET method retrieves information from the destination so it is handled differently from other methods. The proxy node can cache the response and send the response to the source node when it is awake. If the proxy node has updated content, it may not send the GET request to the destination node at all.

When both nodes are sleep nodes, it may cause challenges to the proxy node to cache for both nodes. There can be cases when both sleep nodes are not synchronized. For example, Node 1 sends GET request to Node 2, while Node 2 is sleeping and the proxy node does not have an updated record. Node 2 wakes up and sends updates to the proxy node, and Node 1 may have gone back to sleep in the meantime. To mitigate such a situation, the proxy node can command a sleep node not to go back to sleep for a period of time, or the proxy node may help nodes to synchronize their sleep schedule, using proxy initiated sleep as discussed herein above.

Embodiments contemplate reduced messaging overhead. In accordance with embodiments, retransmission times may be reduced for each message when a node may be in sleep mode. For example, if by default a re-transmission counter is set to 3, the number can be decreased or even set to 0 if the message is sent to a sleep node. Therefore, in case the message cannot be delivered due to the destination being sleeping, the source does not need to re-transmit it again. This can also relieve the source node so it can switch to sleep mode quicker.

Using information from the sleep node such as its sleep schedule and its memory buffer size, a proxy node can implement a flow control mechanism to reduce the loading on the constrained device as well as other devices in the network (e.g. intermediate devices located between the proxy and targeted device). As mentioned herein above, a sleep node could provide a proxy node with its sleep schedule information as part of the CoAP message header or as part of the CoAP resource discovery process (i.e. CoAP link header). This same methodology could also be used to share other device attributes such as buffer size. Using this information, the proxy node may then implement an intelligent flow control mechanism tuned to a sleep node's attributes. This methodology could also be scaled to take into account not just a single sleep node's attribute's but also interdependencies between nodes (e.g. having the proxy perform flow control for a multi-hop network path of devices).

Figure 11:
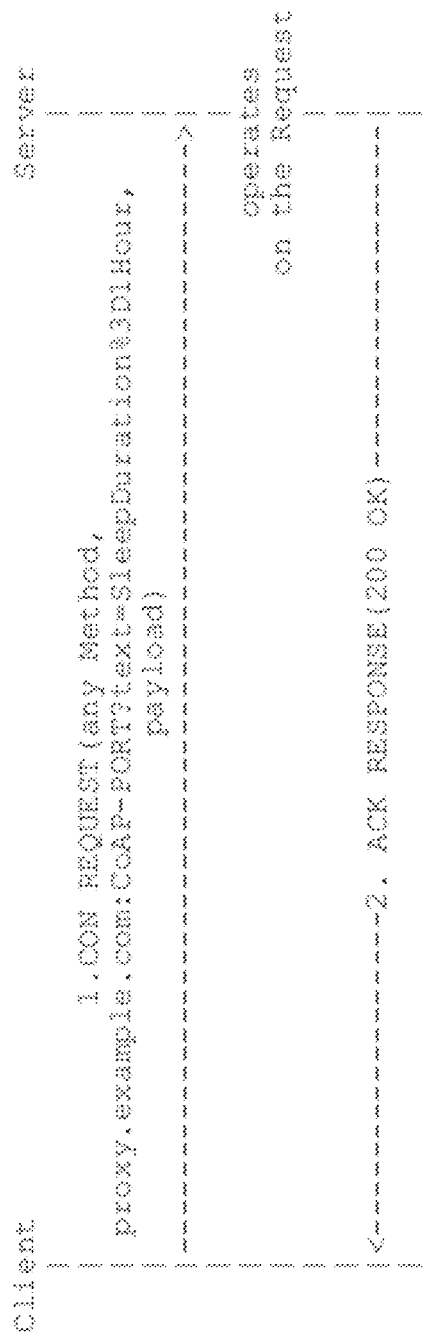
FIG. 11 is a message flow diagram illustrating how the client informs the server that its sleep duration will be 1 hour, and piggy-back the information in a REQUEST, using any suitable method.

Embodiments contemplate "piggy-backing" in request URI. Sleep information can be added in the request URI in the CoAP header options. In this way, the sleep information can be piggybacked in any CoAP messages. FIG. 11 is a message flow diagram illustrating how the client informs the server that its sleep duration will be 1 hour. The sleep information is piggy-backed in the request URI. Such information can be exchanged at any time, using any CoAP method.

By way of details of a URI, a URI may provide a simple and extensible means for identifying a resource. By way of example, each URI may begin with a scheme name that refers to a specification for assigning identifiers within that scheme. As such, the URI syntax is a federated and extensible naming system wherein each scheme's specification may further restrict the syntax and semantics of identifiers using that scheme.

Embodiments contemplate that scheme names may include a sequence of characters beginning with a letter and followed by any combination of letters, digits, plus ("+"), period ("."), or hyphen ("-"), for example. Although schemes may be case-insensitive, the canonical form is lowercase and documents that specify schemes may, and in some embodiments perhaps must, do so with lowercase letters. An implementation may accept uppercase letters as equivalent to lowercase in scheme names (e.g., allow "HTTP" as well as "http") for the sake of robustness and may produce lowercase scheme names for consistency, or in some embodiments perhaps should only produce lowercase scheme names for consistency. For example, scheme=ALPHA*(ALPHA/DIGIT/"+"/"-"/".").

Individual schemes are contemplated. The scheme registry may maintain the mapping between scheme names and their specifications. URI scheme specifications may, and perhaps must, define their own syntax so that all strings matching their scheme-specific syntax may also match the <absolute-URI> grammar.

When presented with a URI that may violates one or more scheme-specific restrictions, the scheme-specific resolution process may, and perhaps should, flag the reference as an error rather than ignore the unused parts. In so doing, the number of equivalent URIs may be reduced and detection of abuses of the generic syntax may be helped, which might indicate that the URI has been constructed to mislead a user. Embodiments contemplate that a resource can be anything physical (such as a device) or abstract (such as a concept). The widely used URL (Uniform Resource Locator) for the Web is a subset of URI.

As referred to herein, the term "uniform resource identifier" or "URI" can be an identifier for a resource. A resource may be anything physical (such as a device) or abstract (such as a concept). A uniform resource locator (URL) is a subset of URI. CoAP splits the URI into three parts: Uri-Scheme, Uri-Authority and Uri-Path. For CoAP, the Uri-Scheme is "coap". The Uri-Authority indicates the host and port of a URI, such as "198.51.100.0:8000". The Uri-Path indicates the absolute path of a resource, such as "s/light".

CoAP [I-D.draft-ietf-core-coap] is an HTTP-like application layer protocol designed for constrained networks. It is a REQUEST/RESPONSE based protocol using the REST (REpresentational State Transfer) architecture. CoAP defines 4 HTTP-like methods: GET, POST, PUT, DELETE.

Figure 12:
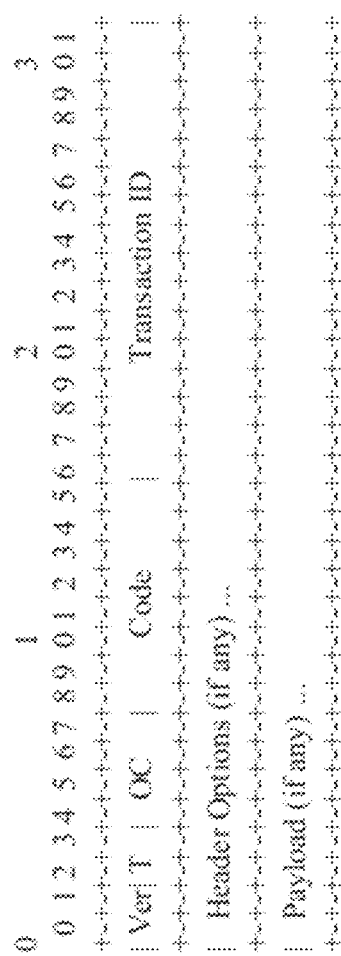
FIG. 12 is an example of CoAP message header format.

FIG. 12 is an example of CoAP message header format.
Header Fields:
  Ver: Version. 2-bit unsigned integer. Indicates the version of CoAP. Implementations of this specification MUST set this field to 1. Other values are reserved for future versions.
  T: 2-bit unsigned integer to indicate Transaction Type field. Indicates if this message is Confirmable (0), Non-Confirmable (1), Acknowledgment (2) or Reset (3).
  OC: 4-bit unsigned integer for Option Count field. Indicates if there are Option Headers following the base header. If set to 0 the payload (if any) immediately follows the base header. If greater than zero the field indicates the number of options to immediately follow the header.
  Code: 8-bit unsigned integer. This field indicates the CoAP Method of the request or the code of a response.
  Transaction ID: 16-bit unsigned integer. A unique Transaction ID assigned by the source and used to match responses. The Transaction ID MUST be changed for each new request (regardless of the end-point) and MUST NOT be changed when retransmitting a request.

The term "CON" refers to confirmable. Some messages require an acknowledgment, either just to know they did arrive or also to deliver the reply to a request. These messages are called "Confirmable".

The term "ACK" refers to Acknowledgment. An Acknowledgment message acknowledges that a specific Confirmable message (identified by its Transaction ID) arrived. It may carry a payload and some options to provide more details.

As referred to herein, a client may be node that initiates a CoAP request. A server may be the recipient of the request. A client and server can be constrained nodes or proxies.

The present disclosure provides methods and apparatus for the IETF CoAP protocol to support exchange of sleep information at discovery phase and dynamically during network operations. The CoAP client and server can exchange the sleep information using any CoAP RESTful methods, such as POST, PUT, GET and the Subscribe/Notification mechanisms.

In accordance with embodiments of the presently disclosed subject matter, may provide sleep-aware support to an application layer protocol that is not supported by existing application layer protocols such as, for example, HTTP or CoAP. Doing so may enable an application layer protocol to more effectively optimize the exchange of application layer messages and as a result maximize the overall efficiency of sleep nodes and proxies. For example, by making sleep schedule information available to a proxy's application layer, the proxy can then implement enhancements to its application layer protocol and messaging that allow it to maintain tighter synchronization with a sleep node. Therefore, the sleep node does not need to check-in with the proxy each time it wakes up, thus optimizing the node's battery lifetime and reducing signaling messages.

Method and system embodiments described herein provide for the IETF CoAP protocol to support exchange of sleep attribute at discovery phase and dynamically during network operations. The CoAP client and server can exchange the sleep attributes using any CoAP RESTful methods, such as POST, PUT, GET and the Subscribe/Notification mechanisms, for example.

Embodiments of the present disclosure can provide the following features:

The encoded sleep attributes can be embedded in the CoAP header options or payload.
Sleep attributes can be treated as a CoAP resource and represented by a URI:
Sleep attributes can be exchanged at discovery phase using link format;
Sleep attributes can be exchanged using well-known URI; and/or
Sleep attributes URI can be exchanged dynamically
Piggy-back sleep attributes in request URI in any CoAP messages.

access resources while the device is sleeping. According to one or more embodiments, sleep attribute information may be provided within the CoAP protocol for allowing a proxy to access resources while the device is sleeping.

Sleep attribute information may include, but is not limited to:

Sleep duration—indicates a maximum duration of time (e.g., in seconds) a node sleeps; and/or
Sleep state—indicates whether a sleep node is currently sleeping or not.

One or more embodiments for exchanging sleep attributes using CoAP are contemplated. Examples provided herein use the notion of client and server. In these examples, a client is the node that may initiate the CoAP request and a server may be the recipient of the request, and a client and server can be constrained nodes or proxies.

Embodiments contemplate that sleep attributes may be embedded in the CoAP Options Header. In embodiments, sleep attributes can be exchanged using any of the supported CoAP message types. In such cases, the sleep node can update its proxy or other client nodes either via a dedicated message or by piggy-backing the update within in an existing message.

The CoAP may support two sleep node attribute header options or alternatives: "Sleep Duration" and "Sleep State". These alternatives are elective so they can be assigned an even number. Assuming the type for "Sleep Duration" may be x, which may be an integer, the header options are illustrated in Table 1 below.

TABLE 1

Exemplary CoAP Sleep Attribute Header Options

| Type | C/E | Name | Data type | Length | Default |
|------|-----|------|-----------|--------|---------|
|      | . . . | Existing Header Options . . . | | | |
| X | E | Sleep Duration | Variable length unsigned integer | 1-4 B | 0 sec |
| X + 2 | E | Sleep State | 8-bit unsigned integer | 1 B | 0 (Awake) 1 (Asleep) |

According to embodiments, methods and systems are provided for the IETF CoAP protocol to support proxy buffering of messages targeting sleeping nodes. Proxy buffering may involve queuing of messages on behalf of a resource while it is unavailable to service the messages itself. Once the resource is available the messages can then be forwarded to the resource to be serviced.

Alternatively or additionally, embodiments contemplate methods and systems that may provide for the IETF CoAP protocol to support proxy caching subscriptions for sleep node resources. Caching a subscription to a resource residing on a sleep node may require a proxy to maintain client subscription state on behalf of the sleep node and send notifications on behalf of the sleep node to the client.

Alternatively or additionally, embodiments contemplate methods and systems that may provide for the IETF CoAP protocol to support an enhanced cache refresh mechanism optimized for networks consisting of sleep nodes.

Embodiments contemplate the exchange of sleep attributes. Clients of sleeping devices may use a proxy to Sleep Duration can have a default value of 0, hence in the absence of this alternative, a node may be assumed to be a non-sleep node. Sleep State can have a default value of 0, hence in the absence of this alternative, a node may be assumed to be 'Awake'. In the event that a client or proxy receives a message containing a Sleep State setting of 1, it can be interpreted that the sleep node is going to enter into sleep mode following the successful completion of this message exchange.

FIG. 13 illustrates a CoAP message with sleep attributes header options according to embodiments. The figure shows how sleep attributes can be shared with other nodes using the header options in a CoAP message. Note, although the 'Sleep Duration' and 'Sleep State' options are shown together in this example, they can also be used independently of one another.

FIG. 14 illustrates a CoAP message exchange with sleep attributes header options according to embodiments. The figure shows an example where a sleep node includes sleep attributes within the header of a response message.

Embodiments contemplate that sleep attributes can be implemented using a dedicated sleep attributes CoAP resource with a corresponding URI. This may provide a proxy or other client nodes accessibility to a node's sleep attributes via this corresponding resource. This resource can be implemented either locally on the sleep node itself or remotely on another node such as a proxy, for example.

Below are some examples of a URI representation of a sleep attributes resource. CoAP splits the URI into Uri-Scheme, Uri-Authority and Uri-Path Options:

coap://sensor1.example.com:COAP_TBD_PORT/Sleep; and/or coap://sensor1.example.com:COAP_TBD_PORT/Sleep/SleepDuration A link to the sleep attributes resource can be included in the list of resources hosted by a node and discoverable via queries to the node's well-known resource (e.g. GET/.well-known/core).

Figure 15:
FIG. 15 illustrates a query of a resource for sleep attributes according to embodiments.

FIG. 15 illustrates a query of a resource for sleep attributes according to embodiments.

Embodiments contemplate that, in response to a client or proxy discovering the sleep attributes resource of a node, it can then query (e.g., GET sensor1.example.com:CoAP-PORT/Sleep) to obtain the sleep attributes of the node. The sleep attributes can then be returned in the CoAP header options of the response message. In addition, a client or proxy can also subscribe to the sleep attributes resource and have the sleep node notify it of changes to its sleep attributes if/when they occur.

Alternatively or additionally, embodiments contemplate that individual sleep attributes may be carried within the link format description of the sleep attributes resource itself. For example, individual sleep attributes can be carried in the link-value and link-extensions fields of the link format description. Doing so can allow a client to obtain sleep attributes of a node during resource discovery rather than having to perform an additional query of the sleep attributes resource thereafter.

Alternatively or additionally, embodiments contemplate that in CoAP resource discovery, the CoAP URI can also be used to carry the sleep attributes, perhaps rather than relying on a dedicated sleep attributes resource. For example, /.well-known/core/sleep. Therefore, a proxy or client can query a node to get its sleep attributes using a GET request. [GET/.well-known/core/sleep] returns a list of sleep attributes stored under this location. The sleep attributes can be returned in the CoAP header options of the ACK response message.

Figure 16:
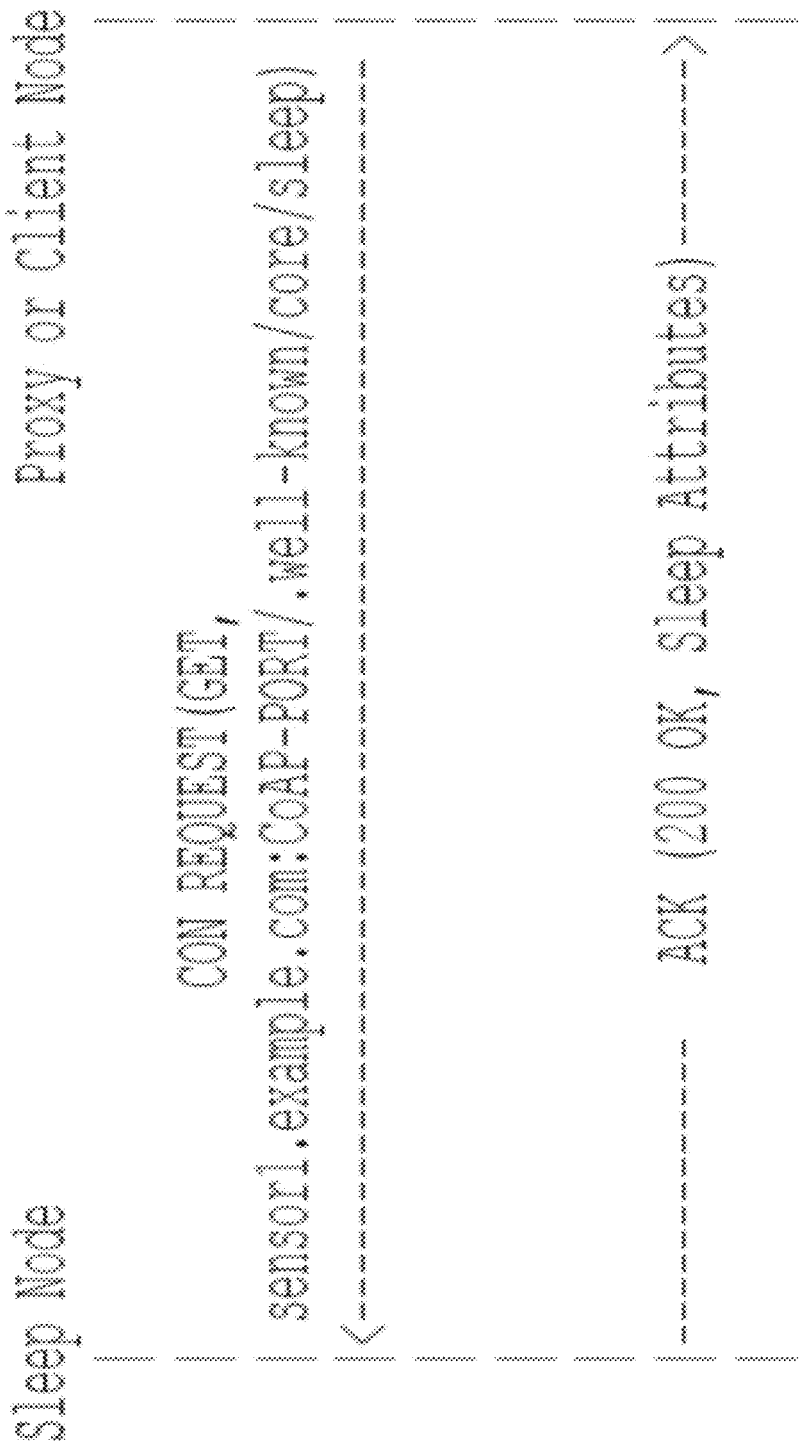
FIG. 16 illustrates an example exchange of sleep attributes using URI according to embodiments.

FIG. 16 illustrates an example exchange of sleep attributes using URI according to one or more embodiments.

Figure 17:
FIG. 17 illustrates a message flow diagram of creating/maintaining sleep attributes on a proxy resource according to embodiments.

FIG. 17 illustrates a message flow diagram of creating/maintaining sleep attributes on a proxy resource according to embodiments. The figure shows an approach where a sleep node creates a sleep attributes resource remotely on its proxy via a POST operation. Later, the sleep node may issue a GET request to the sleep attributes resource on the proxy to obtain an updated version of its sleep attributes which have been potentially updated by the proxy. For example, a proxy node may instruct the constrained node to use certain sleep attributes which the proxy has coordinated across other nodes on the network. Alternatively or additionally, embodiments contemplate that the sleep node can also make future updates to its sleep attributes by performing a PUT operation to the proxy's resource.

An example advantage of using a sleep attributes resource is that sleep attributes become a known resource for the sleep node, proxy, and other nodes. Additional sleep attributes can be exchanged, and the format can be more flexible (compared to embedding sleep attributes into the headers of existing message exchanges). Additionally, the sleep attributes may be managed remotely in a centralized repository, not necessarily locally on the sleep node itself. This can facilitate centralized control and configuration of sleep attributes for sleep nodes within a network.

Figure 18:
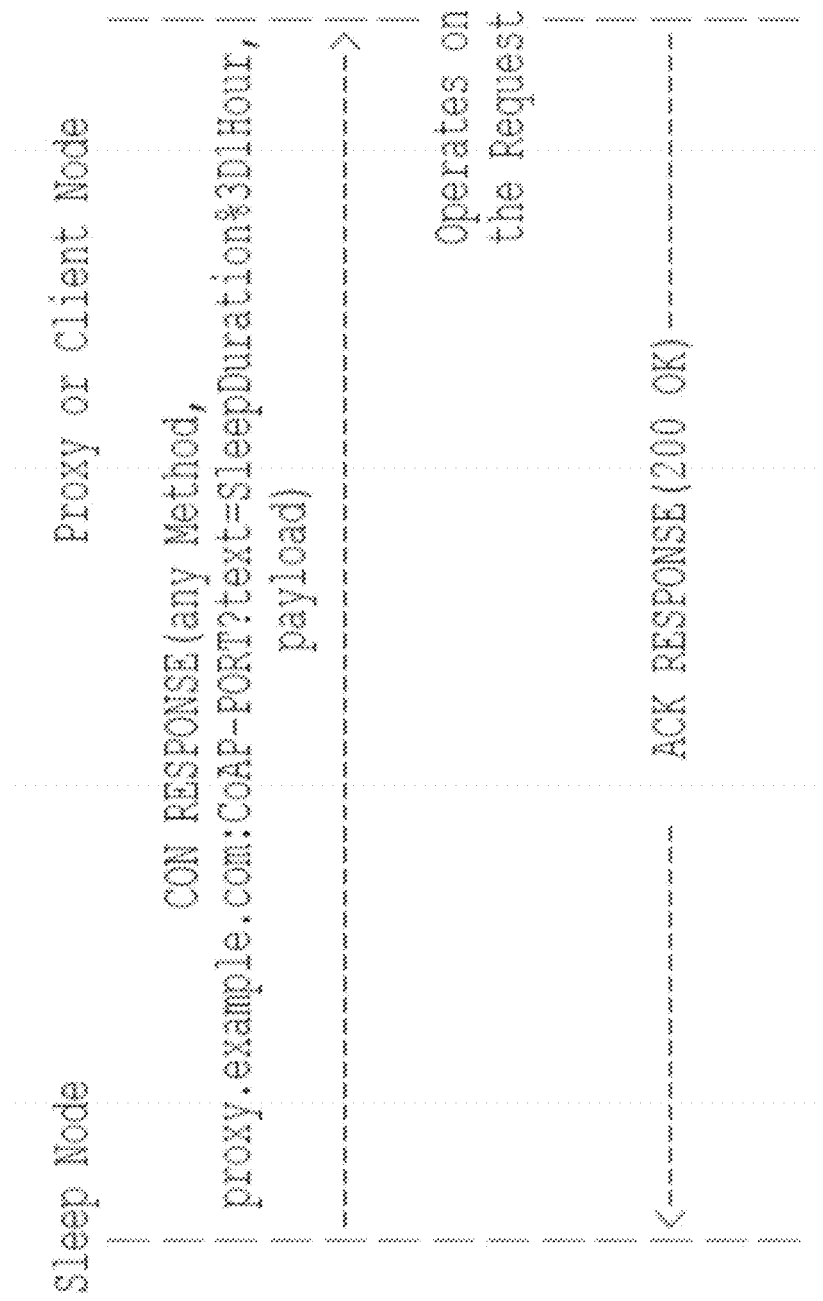
FIG. 18 illustrates an example where the sleep node informs the proxy that its sleep duration will be 1 hour in accordance with embodiments.

Alternatively or additionally, embodiments contemplate that sleep attributes can be added in the request URI within the CoAP header options, perhaps rather than defining new dedicated sleep attribute header options. In this way, the sleep attributes can be piggybacked in any CoAP message. FIG. 18 illustrates an example where the sleep node informs the proxy that its sleep duration will be 1 hour in accordance with one or more embodiments. The sleep attributes are piggy-backed in the response URI. Embodiments contemplate that such attributes can be exchanged at any time, using any suitable CoAP method.

Embodiments contemplate one or more sleep node attribute use scenarios. Example sleep duration scenarios follow:

A proxy can detect whether a resource resides on a sleep node and may determine whether a proxy buffer is required as well as the amount of corresponding resources to allocate (e.g. larger buffer for sleep nodes having larger max sleep duration values);

A client can determine if a resource resides on a sleep node and hence whether or not a proxy may, or perhaps must, be used to access the resource; and/or A proxy or client can optimally configure their response timeout value to take into account the time a node spends sleeping.

Embodiments contemplate one or more example of sleep state use cases, such as:

A proxy or client can more optimally schedule cache refreshes to a sleep node's resource such that it occurs while the sleep node is awake;

A proxy or client can reduce network congestion by throttling (e.g. buffering) requests to sleeping nodes;

Using the sleep state, a proxy or client can optimize scheduling messages to a sleep node for cases where the sleep duration is larger than the retransmission window calculated as RESPONSE_TIMEOUT*(2^MAX_RETRANSMIT−1). Doing so can avoid the occurrence of a max retransmission error while the node is sleeping; and/or Optimize when to schedule sending of messages (E.g. schedule requests when sleep node is awake and possibly avoid the need to use a proxy).

Embodiments contemplate that proxy buffering can involve queuing of messages on behalf of a resource while it may be unavailable to service the messages itself. Once the resource is available the messages are then forwarded to the resource to be serviced (e.g. PUT request to a sleep node resource). This may be in contrast to caching, where a proxy can service a message on behalf of resource without having to forward any messages to the resource (e.g. servicing a GET request using a cached version of the resource).

Embodiments contemplate that support for proxy caching in CoAP. To support a proxy buffering feature in CoAP, a mechanism may be provided for a proxy to determine when (and when not) to buffer for a corresponding resource. Sleep Node Attributes can be leveraged by a proxy to help make this determination. For example, if a resource supports a PUT operation and it resides on a node having a non-zero Sleep Duration then the resource is a candidate for buffering by a proxy. In addition, if the Sleep State of this resource changes to 'Asleep' then the proxy may, or perhaps should, enable buffering. Likewise, if the Sleep State of the resource changes to 'Awake' then the proxy may, or perhaps should, start forwarding any buffered messages to the resource.

Figure 19:
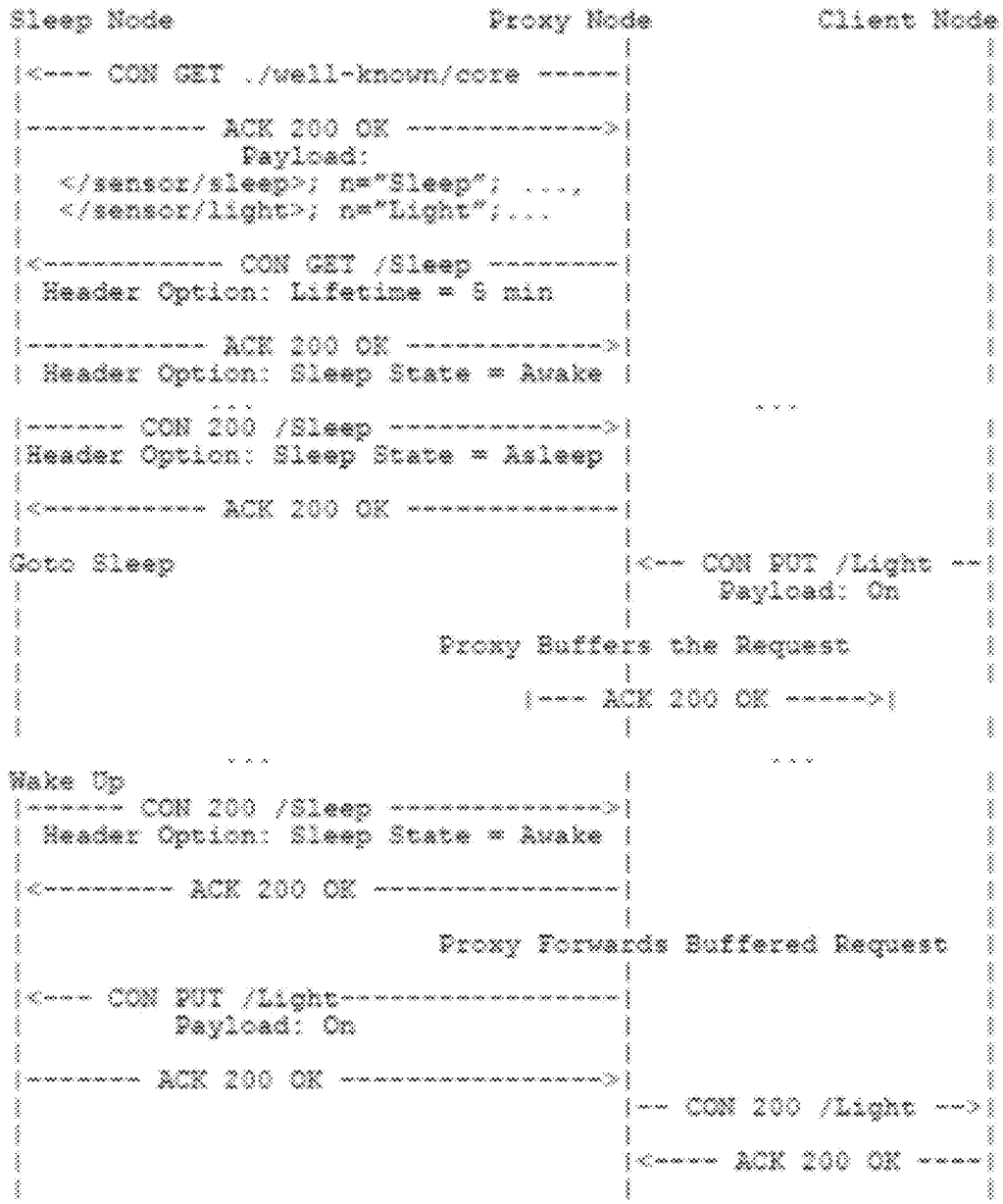
FIG. 19 shows an example of a proxy buffering a PUT request message on behalf of a sleep node.

FIG. 19 shows an example of a proxy buffering a PUT request message on behalf of a sleep node. In this example, the proxy discovers the sleep attributes resource of the sleep node by querying its well-known resource. The proxy may then subscribe to the sleep attributes resource such that it is notified of changes. The resource then notifies the proxy each time its sleep attributes are updated. This is an example of how sleep attributes can be shared between the sleep node and its proxy.

Using the Sleep State attribute, the proxy may start buffering incoming messages when it is notified that the resource is entering sleep mode. Likewise, the proxy forwards buffered messages to the resource when it is notified that the resource has exited sleep mode.

Embodiments contemplate that an incremental feature enhancement may allow the proxy to convey the number of buffered messages to the sleep node using a CoAP header alternative. In doing so, a sleep node can be made aware of the number of buffered messages that are waiting to be serviced at the proxy and may refrain from going back to sleep until some or all buffered messages have been serviced. For example, in FIG. 19, the proxy could include this header alternative within the ACK message to the 'Awake' notification. Table 2 shows a CoAP number of buffered messages header option.

TABLE 2

Exemplary CoAP number of Buffered Messages Header Option

```
+-------+-----+----------+-------------+--------+-----------+
| Type  | C/E | Name     | Data type   | Length | Default   |
+-------+-----+----------+-------------+--------+-----------+
|       | . . . Existing Header Options . . . |        |           |
|       |     |          |             |        |           |
| X     | E   | Number of| Variable    | 1-4 B  | 0         |
|       |     | Buffered | length      |        |           |
|       |     | Messages | unsigned    |        |           |
|       |     |          | integer     |        |           |
|       |     |          |             |        |           |
+-------+-----+----------+-------------+--------+-----------+
```

Figure 20:
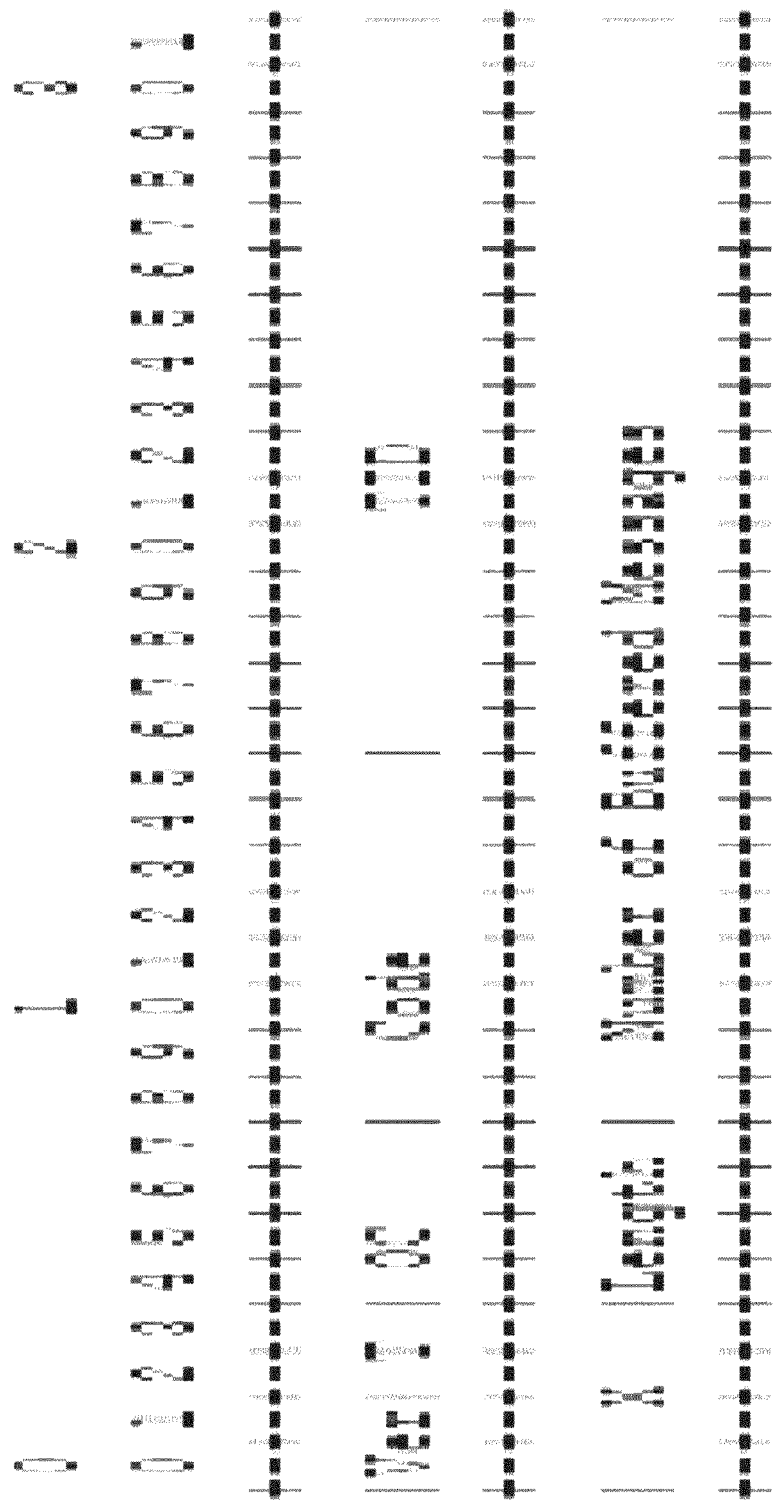
FIG. 20 shows an example CoAP message indicating a number of buffered messages.

FIG. 20 shows an example CoAP message indicating a number of buffered messages.

Embodiments contemplate proxy caching for sleep node resources. Embodiments contemplate that CoAP may, or perhaps must, support the caching of recent resource requests, along with caching subscriptions to sleeping nodes. Unlike caching the response to a recent resource request (e.g. response to a GET request), caching a subscription to a resource residing on a sleep node requires a proxy to maintain client subscription state on behalf of the sleep node. By maintaining client subscription state, a proxy can then send notifications on behalf of the sleep node to the client. These notifications can be initially serviced by the proxy using its cached version of the sleep node resource. Thereafter, as the proxy receives resource updates from the sleep node, it can provide notification updates to all subscribed clients on behalf of the sleep node. Contemplate embodiments define functionality for caching subscriptions to sleeping nodes such that a proxy can send notification responses on behalf of a sleeping node.

Figure 21:
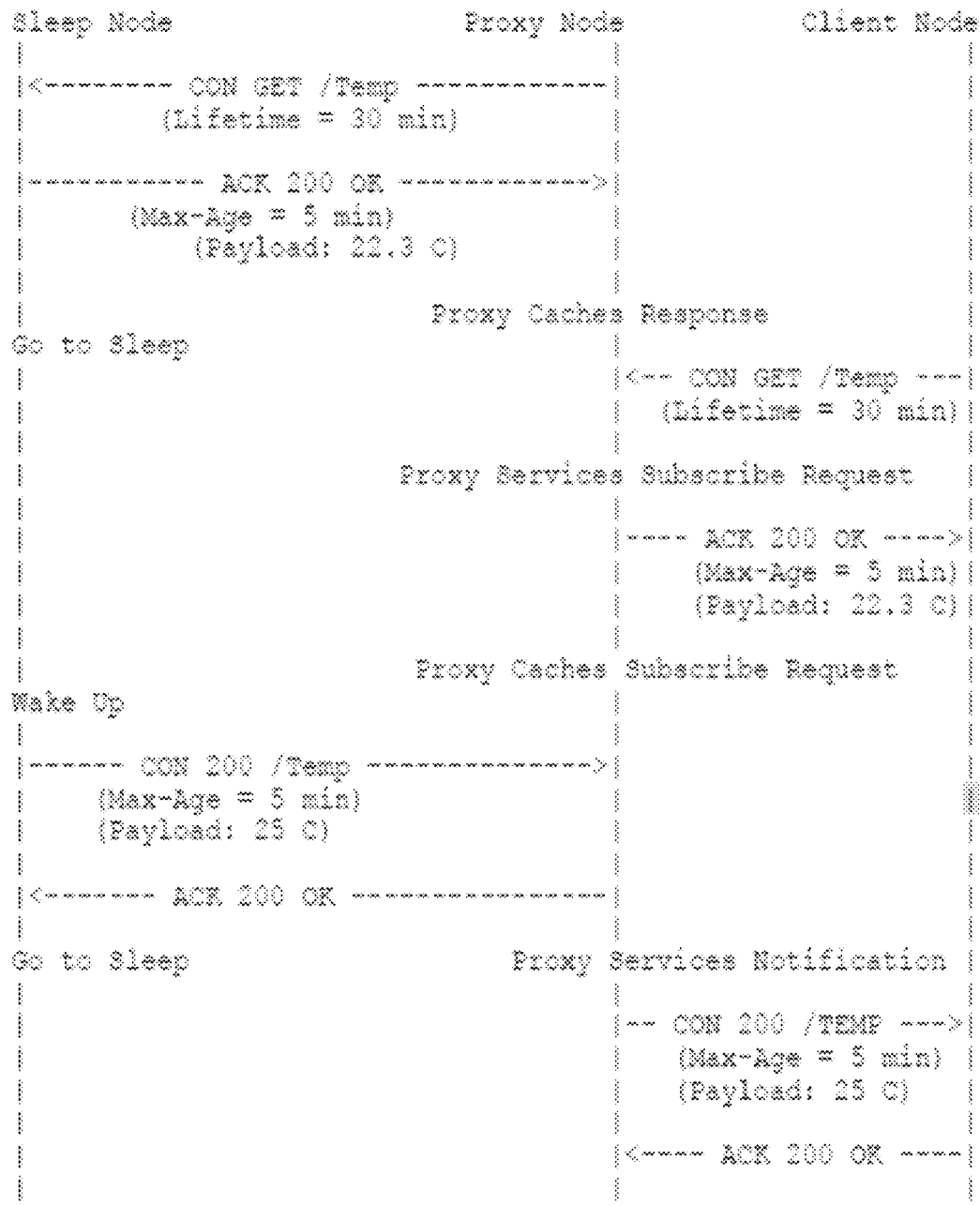
FIG. 21 is a message flow diagram of a proxy subscribing to a sleep node resource and receiving a response from the sleep node resource which it caches according to embodiments.

FIG. 21 illustrates a message flow diagram of a proxy subscribing to a sleep node resource and receiving a response from the sleep node resource which it caches according to an embodiment. The proxy then receives a subscribe request to the same sleep node resource which it services on behalf of the sleep node, using its locally cached version of the resource value. In addition, the proxy also maintains a cached version of the client's subscription request. Later when the sleep node wakes-up and provides a notification to the proxy with an updated value for the Temp resource, the proxy creates a corresponding notification to the subscribed client. In doing so, the proxy can off-load work from the sleep node since the sleep node does not need to maintain a subscription for the client. In addition, the proxy can provide notifications to the client node even when the sleep node is sleeping.

Figure 22:
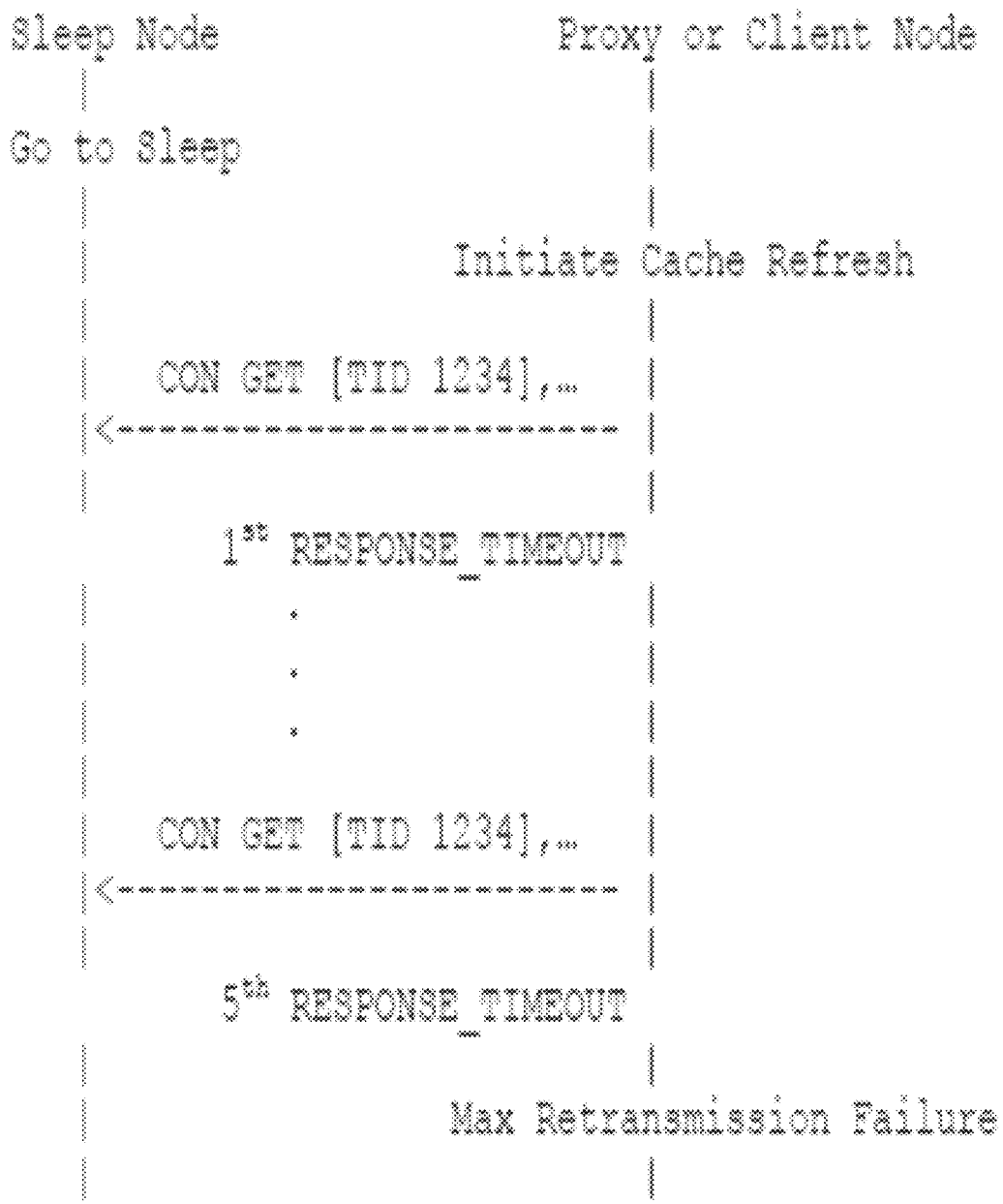
FIG. 22 is a message flow diagram of a cache refresh with maximum retransmission failure according to embodiments.

Embodiments contemplate that CoAP may define cache refresh functionality using a CoAP GET request, for example. Although this scheme may be adequate for networks consisting of non-sleep nodes, it can be problematic for networks having sleep nodes. For example, a GET request to a sleep node with a sleep duration that exceeds the CoAP retransmission window defined by RESPONSE_TIMEOUT*(2^MAX_RETRANSMIT−1) can result in a timeout as shown in FIG. 22. For the case where a resource is implemented on a sleep node, the use of a CoAP GET request to support a cache refresh operation may not be optimal hence alternatives are needed. Embodiments contemplate that this problem may be most prevalent for nodes that communicate directly with sleep nodes. For example, a proxy for a sleep node or possibly a client node that communicates directly with a sleep node (in the event that a proxy is not available). For nodes that communicate indirectly with a sleep node via a proxy, this may be less of a problem since the caching and buffering implemented by the proxy can help alleviate this issue.

Embodiments contemplate that, for cache refresh, supporting sleep nodes may include leveraging a subscribe/notify scheme. When deciding to cache a resource that resides on a sleep node, a proxy or client can rely on notifications from the sleep node to refresh its cached version of the resource rather than initiating a GET request to the sleep node resource. Once subscribed to a resource, a proxy or client can receive cache refresh notification from a sleep node (e.g., each time the sleep node wakes-up).

Figure 23:
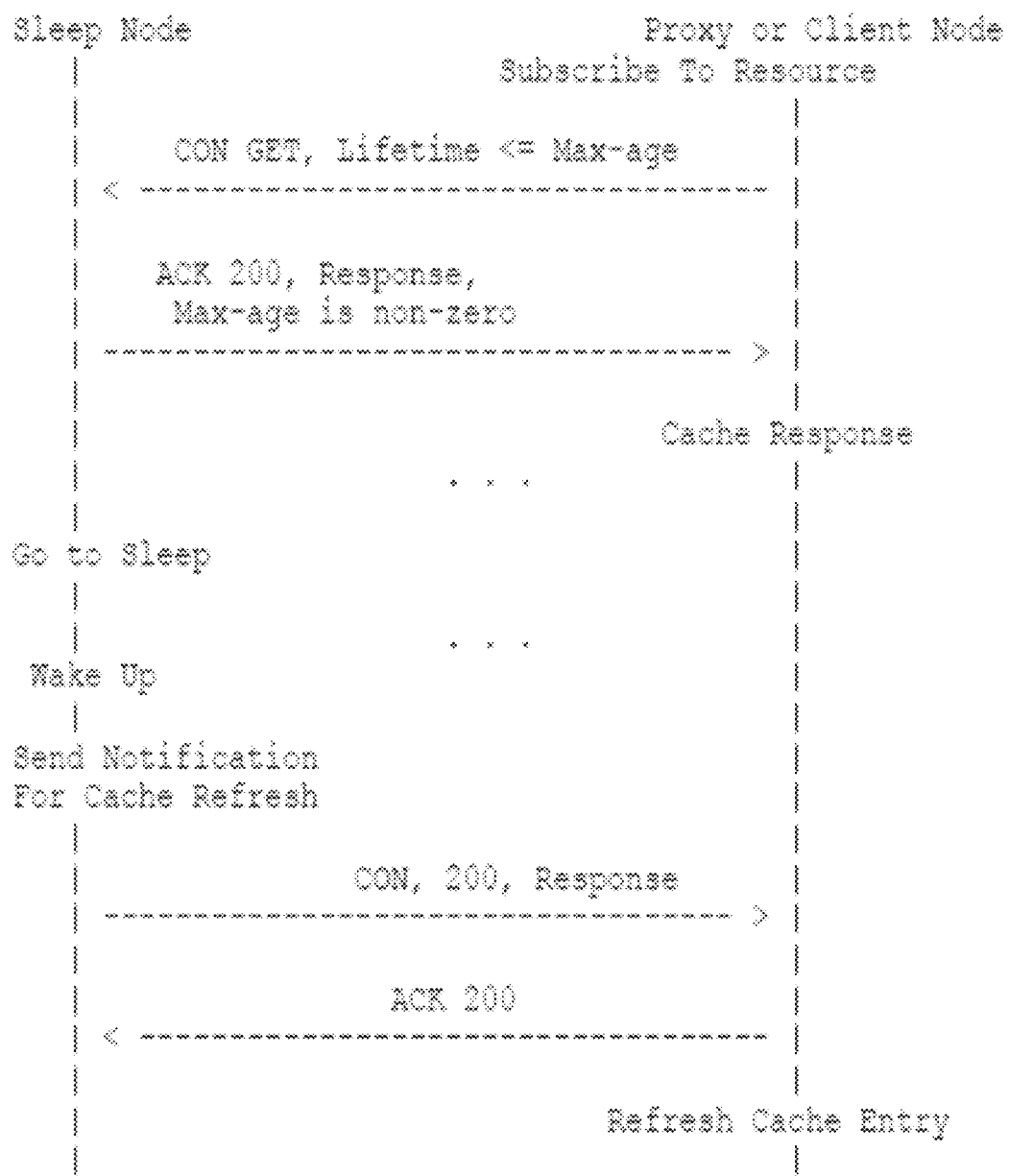
FIG. 23 is an example message flow diagram including a buffered cache refresh request and response according to embodiments.

FIG. 23 illustrates an example message flow diagram including a buffered cache refresh request and response according to embodiments. Embodiments contemplate that when sleep nodes are involved, care should be exercised when configuring the CoAP Max-age header option. Max-age may, and perhaps should, be configured such that it is greater than the cumulative sleep duration of all sleep nodes located in the path between the proxy/client and the sleep node. Otherwise, the cached representation of a resource can timeout prematurely before a refresh notification is received. Embodiments also contemplate that the value of Subscription Lifetime may be greater than both the Max-Age and Sleep Duration.

Embodiments contemplate methods and apparatus for the IETF CoAP protocol to support exchange of sleep information at discovery phase and dynamically during network operations. The CoAP client and server can exchange the sleep information using any CoAP RESTful methods, such as POST, PUT, GET and the Subscribe/Notification mechanisms.

Figure 24:
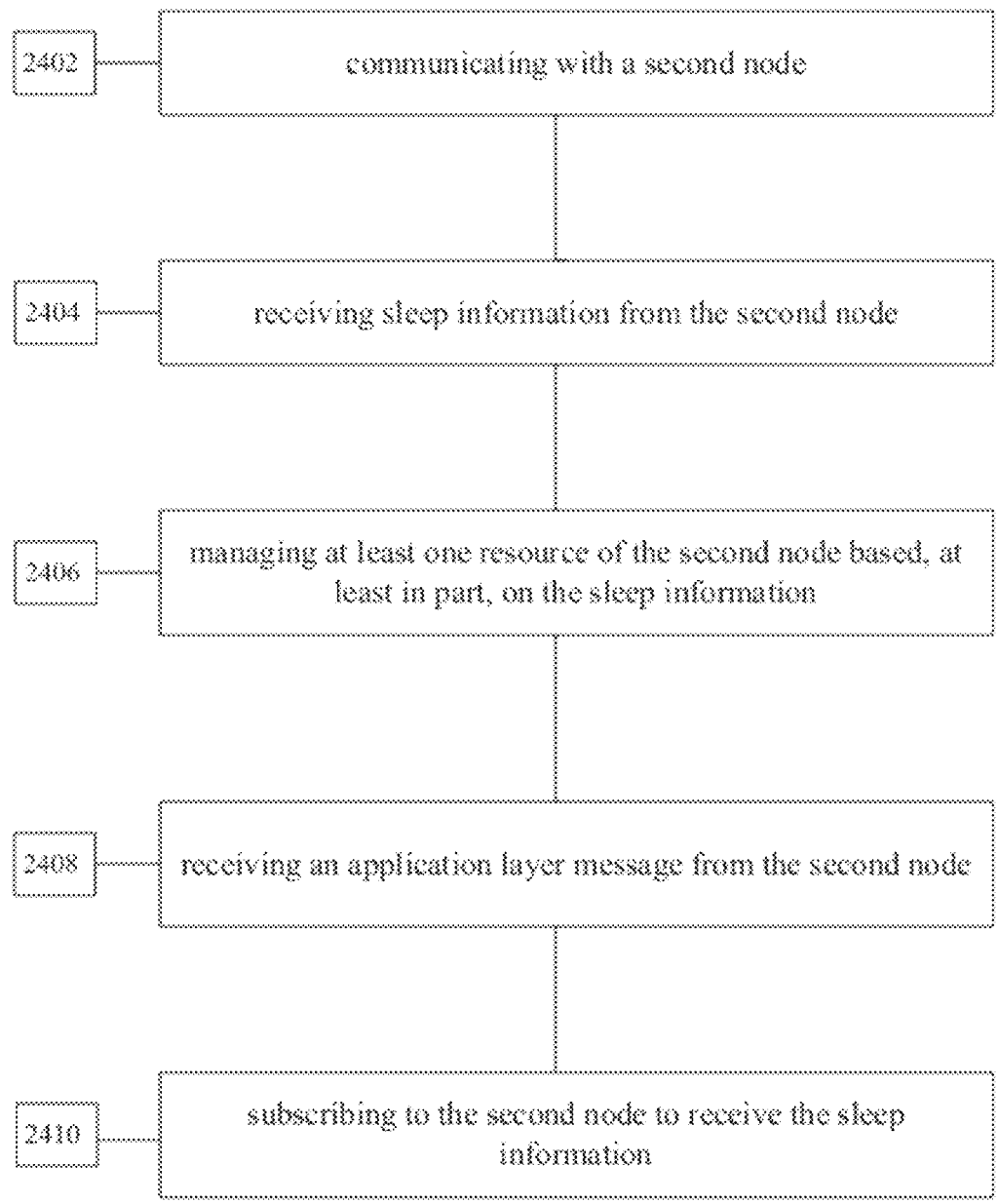
FIG. 24 illustrates a flowchart of an exemplary constrained nod interfacing embodiment.

In light of the previous description, and referring to FIG. 24, embodiments contemplate that a first node may be associated with a first communication network and the first node may also be in communication with a second communication network. The first node may perform methods that, at 2402, may include communicating with a second node, where the second node may be associated with the second communication network. At 2404, embodiments contemplate receiving sleep information from the second node, and at 2406, managing at least one resource of the second node based, at least in part, on the sleep information. Embodiments contemplate that the first node may be a non-constrained node, and that the first node may function as a proxy node. Embodiments contemplate that the second node may be a constrained node. At 2408, embodiments contemplate receiving an application layer message from the second node.

Figure 25:
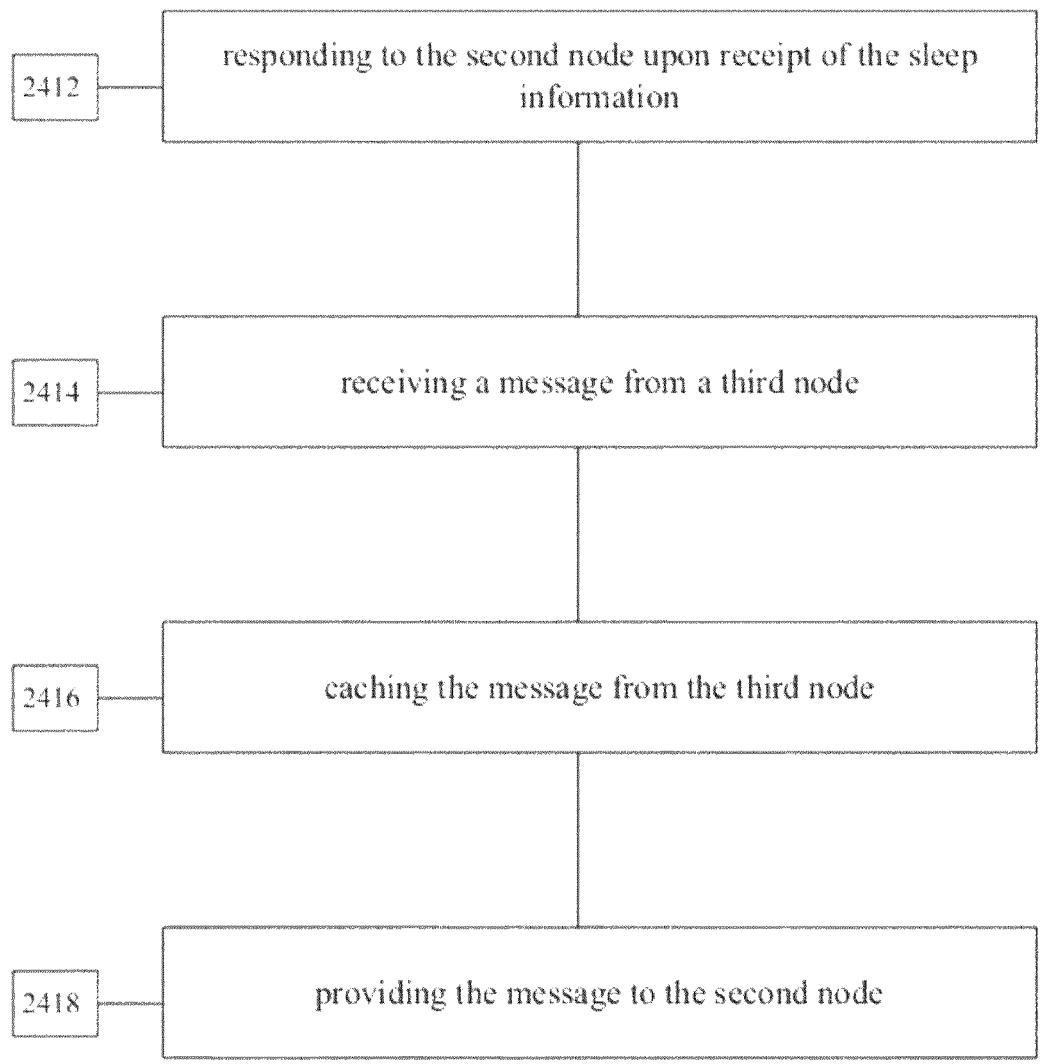
FIG. 25 illustrates a flowchart of another exemplary constrained node interfacing embodiment.

Embodiments contemplate that the sleep information may be included in one or more fields of the application layer message, and the one or more fields of the application layer message may be a part of at least one of a header or a payload. Further, embodiments contemplate, at 2410, subscribing to the second node to receive the sleep information. Referring to FIG. 25, embodiments contemplate, at 2412, responding to the second node upon receipt of the sleep information. Embodiments contemplate that the application layer message may be provided in at least one of hypertext transfer protocol (HTTP) or a constrained application protocol (CoAP). Also, embodiments contemplate that the sleep information may include at least one of a sleep duration or a sleep state. Embodiments contemplate, at 2414, receiving a message from a third node, where the third node may be associated with the first communication network, and the message from the third node may be directed to the second node. Also, embodiments contemplate that the management of the at least one resource of the second node may include, at 2416, caching the message from the third node and, at 2418, providing the message to the second node.

Figure 26:
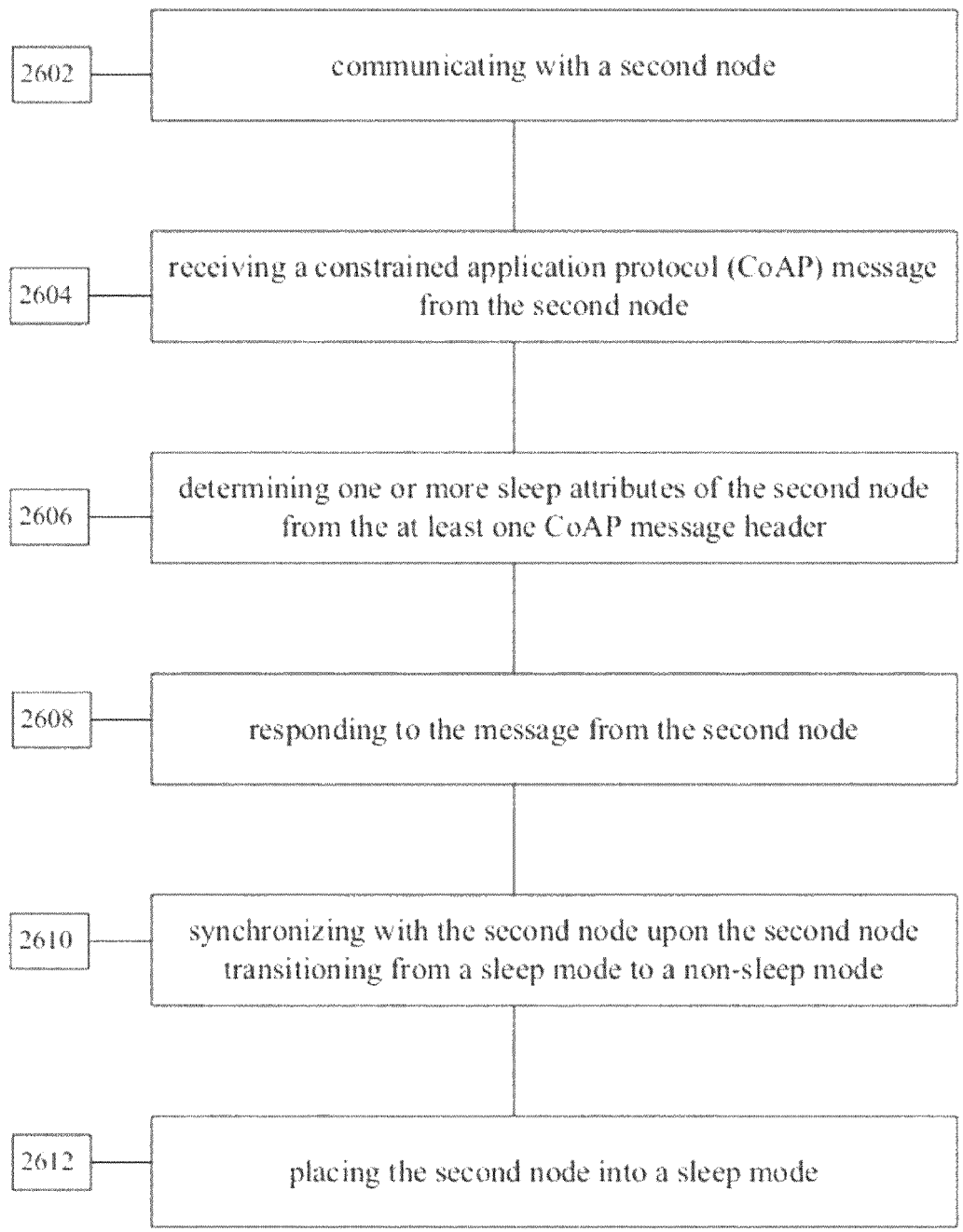
FIG. 26 illustrates a flowchart of another exemplary embodiment constrained node interfacing embodiment.

Referring to FIG. 26, embodiments contemplate that a first node may be associated with a first communication network and the first node may also be in communication with a second communication network. The first node may perform methods that, at 2602, may include communicating with a second node, where the second node may be associated with the second communication network. At 2604, embodiments contemplate receiving a constrained application protocol (CoAP) message from the second node, where the CoAP may include at least one header. Also, embodiments contemplate, at 2606, determining one or more sleep attributes of the second node from the at least one CoAP message header, and at 2608, responding to the message from the second node. In addition, embodiments contemplate that the sleep attributes may be represented by a uniform resource identifier (URI) in the at least one CoAP message header. Embodiments contemplate, at 2610, synchronizing with the second node upon the second node transitioning from a sleep mode to a non-sleep mode. And embodiments contemplate, at 2612, placing the second node into a sleep mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A first node, the first node being associated with a first communication network and the first node being in communication with a second communication network, the first node being configured, at least in part, to:
   communicate with a second node, the second node being associated with the second communication network;
   receive a first sleep information from the second node, the first sleep information encoded in a uniform resource identifier (URI) of a first constrained application protocol (CoAP) message;
   update the first sleep information to form an updated sleep information; and
   send the updated sleep information to the second node, the updated sleep information encoded in a URI of a second CoAP message.

2. The first node of claim 1, wherein the first node is a non-constrained node, and the first node functions as a proxy node.

3. The first node of claim 1, wherein the second node is a constrained node.

4. The first node claim 1, wherein the processor is further configured such that the updated sleep information is sent to the second node in response to a request from the second node.

5. The first node of claim 1, wherein at least one of the first sleep information or the updated sleep information includes at least one of a sleep duration or a sleep state.

6. The first node of claim 1, wherein the first node is further configured to:
   manage at least one resource of the second node based, at least in part, on the first sleep information; and
   receive a message from a third node, the third node being associated with the first communication network, and the message from the third node being directed to the second node.

7. The first node of claim 6, wherein the management of the at least one resource of the second node includes caching the message from the third node and providing the message to the second node.

8. A method, the method performed by a first device, the first device being associated with a first communication network and the first device being in communication with a second communication network, the method comprising:
   communicating by the first device with a second device, the second device being associated with the second communication network;
   receiving at the first device a first sleep information from the second device, the first sleep information encoded in a uniform resource identifier (URI) of a first constrained application protocol (CoAP) message;

updating at the first device the first sleep information to form an updated sleep information; and sending the updated sleep information from the first device to the second device, the updated sleep information encoded in a URI of a second CoAP message.

9. The method of claim 8, wherein the first device is a non-constrained device, the first device functions as a proxy device, and the second device is a constrained node.

10. The method of claim 8, wherein the updated sleep information is sent to the second node in response to a request from the second node.

11. The method of claim 8, wherein the method further comprises subscribing to the second device to receive the first sleep information.

12. The method of claim 8, wherein the method further comprises responding to the second device upon receipt of the first sleep information.

13. A method, the method performed by a first device, the first device being associated with a first communication network, and the first device being in communication with a second communication network, the method comprising:

communicating by the first device with a second device, the second device being associated with the second communication network;

performing by the first device a resource discovery of the second device;

receiving at the first device a first constrained application protocol (CoAP) message from the second device, the first CoAP message including at least one header;

determining by the first device based on an indicator in the at least one header that the second device is operating under a sleep pattern triggered by an external event; and determining by the first device one or more sleep attributes of the second device from a link format description of a sleep attributes resource during the resource discovery of the second device.

14. The method of claim 13, further comprising sending a second CoAP message to the second device from the first device, wherein the second CoAP message includes an indication in a header, the indication indicating a number of messages for the second device being buffered at the first device.

15. The method of claim 13, wherein the method further comprises synchronizing with the second device upon the second device transitioning from a sleep mode to a non-sleep mode.

16. The method of claim 13, wherein the method further comprises placing the second device into a sleep mode.

* * * * *